United States Patent
Ap et al.

(10) Patent No.: US 7,168,398 B2
(45) Date of Patent: Jan. 30, 2007

(54) SYSTEM FOR MANAGING THE HEAT ENERGY PRODUCED BY A MOTOR VEHICLE HEAT ENGINE

(75) Inventors: Ngy Srun Ap, Saint Remy les Chevreuse (FR); Pascal Guerrero, Le Mesnil Saint Denis (FR); Philippe Jouanny, Guyancourt (FR)

(73) Assignee: Valeo Thermique Moteur, La Verriere (FR)

( * ) Notice: Subject to any disclaimer, the term of this patent is extended or adjusted under 35 U.S.C. 154(b) by 0 days.

(21) Appl. No.: 10/495,388

(22) PCT Filed: Nov. 8, 2002

(86) PCT No.: PCT/FR02/03852

§ 371 (c)(1),
(2), (4) Date: May 12, 2004

(87) PCT Pub. No.: WO03/042515

PCT Pub. Date: May 22, 2003

(65) Prior Publication Data

US 2005/0000473 A1    Jan. 6, 2005

(30) Foreign Application Priority Data

Nov. 13, 2001 (FR) .................................. 01 14662
Sep. 18, 2002 (FR) .................................. 02 11564

(51) Int. Cl.
*F01P 7/16* (2006.01)

(52) U.S. Cl. .................................. 123/41.1; 123/41.31

(58) Field of Classification Search ............... 123/41.1, 123/41.31, 41.51
See application file for complete search history.

(56) References Cited

U.S. PATENT DOCUMENTS

| | | | | |
|---|---|---|---|---|
| 5,215,044 A | * | 6/1993 | Banzhaf et al. .......... | 123/41.29 |
| 5,353,757 A | * | 10/1994 | Susa et al. ............... | 123/41.29 |
| 2003/0079698 A1 | * | 5/2003 | Morgan et al. ........... | 123/41.1 |
| 2004/0173167 A1 | * | 9/2004 | Chanfreau et al. ....... | 123/41.1 |
| 2005/0000473 A1 | * | 1/2005 | Ap et al. ................. | 123/41.1 |

FOREIGN PATENT DOCUMENTS

WO    WO 0134952 A1 *   5/2001

* cited by examiner

*Primary Examiner*—Stephen K. Cronin
*Assistant Examiner*—Jason Benton
(74) *Attorney, Agent, or Firm*—Ronald S. Courtney

(57) ABSTRACT

The system for managing the heat energy developed by a heat engine (10) of a motor vehicle comprises a main system (2) equipped with a main pump (12), a heat engine (10) and a main cooling radiator (18). The main system (2) furthermore comprises a short-circuit pipeline (20) and a heating pipeline (22) comprising an air heater (24), and a secondary loop (4) including a secondary radiator (60) and a secondary pump (58). The main system and the secondary loop can comprise equipments heated or cooled by equipment exchangers (34, 36, 38, 64, 66) included in the main system (2) and/or the secondary loop (4). The maim system (2) and the secondary loop (4) are connected by interconnecting means which make it possible to cause a same coolant fluid to circulate in a controlled manner between the main system and the secondary loop or to prohibit this circulation depending on the load state of the engine (10).

23 Claims, 22 Drawing Sheets

SYSTEM FOR MANAGING THE HEAT ENERGY PRODUCED BY A MOTOR VEHICLE HEAT ENGINE

The invention relates to a system for managing the heat energy developed by a heat engine of a motor vehicle comprising a main system equipped with a main pump to make a coolant fluid circulate between the heat engine and a main cooling radiator exchanging heat with the external atmospheric air, the main system furthermore comprising a short-circuit pipeline and a heating pipeline comprising an air heater, and a secondary loop including a secondary radiator and a secondary pump.

The heat engines of motor vehicles are cooled by means of a cooling radiator paced at the front of the vehicle. A cooling fluid circuit makes it possible to cause a coolant fluid to circulate between the heat engine and the cooling radiator in order to cool the engine.

The heat energy released by the engine is also used to heat the passenger compartment of the vehicle by causing the coolant fluid to pass through an air heater. Furthermore, modern motor vehicles increasingly comprise equipments which exchange heat energy with their external environment. The majority of these equipments must be cooled. This is the case, in particular, of the condenser which forms part of the air conditioning circuit of the passenger compartment of the motor vehicle, but also of the cooling radiator of the oil circuit and of the supercharging air cooling radiator. Furthermore, exhaust gasses are increasingly often being cooled in order to reduce pollution.

Other equipments, less numerous, must on the contrary be heated. This is the case, in particular, of the exchanger of the fuel heater.

In vehicles currently being manufactured, a special fluid circuit is provided for each equipment to be cooled or to be heated. For example, the air conditioning circuit of the vehicle's passenger compartment comprises a heat exchanger, constituting a condenser, disposed at the front of the vehicle in front of the cooling radiator of the heat engine. A special refrigerating fluid, separate from the coolant fluid of the heat engine, traverses the air conditioning circuit. Special pipes are necessary to connect the condenser to the evaporator which is located in the casing of the air conditioning and heating unit for the passenger compartment of the vehicle.

Similarly, if the vehicle is equipped with a supercharging air cooler, the cooling of the air is carried out in an air-to-air heat exchanger which is disposed at the front of the vehicle and which is cooled by a flow of atmospheric air.

This design results in the presence of a large number of pipelines and pipes under the hood of the engine, for example the air intake pipes necessary for the supercharging air cooler that are costly to bring to the front of the vehicle because their routing is complex and because they are bulky.

The purpose of the present invention is a system for managing the heat energy developed by a heat engine which reduces the bulkiness of the fluid circuits.

This purpose is achieved, according to the invention, by the fact that the main system and the secondary loop are connected by interconnecting means which make it possible to cause the coolant fluid to circulate in a controlled manner between the main system and the secondary loop or to prohibit this circulation depending on the load state of the heat engine.

The said interconnecting means are capable, for example, of directly connecting:

One or more inlets and/or outlets of the main cooling radiator with the secondary loop, and/or One or more inlets and/or outlets of the secondary radiator with the main loop.

The expression "capable of directly connecting" means that the said interconnecting means are capable of establishing a connection allowing the passage of the fluid between the radiator of one of the loops and the other loop, without passage through another device in which a substantial heat exchange would take place.

The said engine will be able to have a unique inlet and a unique outlet for the circulation of the coolant fluid in the engine.

Frequently, the motor vehicle comprises one or more equipments exchanging heat with the environment which is outside them by the intermediary of an equipment heat exchanger, the equipment heat exchanger or exchangers being included in the primary system and/or in the secondary loop, each heat exchanger exchanging heat with the coolant cycle fluid.

Because of this characteristic, it is not necessary to bring each of the equipment heat exchangers to the front face of the vehicle. There is a much greater freedom in positioning them in an appropriate location under the hood of the motor vehicle. In particular, the equipment heat exchangers can be brought close to the equipment that they are cooling. The length of the pipelines is thus greatly reduced, which consequently reduces their space requirement. Furthermore, the quantity of coolant fluid which flows through these pipelines is also significantly reduced, which allows a cost reduction because these fluids are generally expensive.

Furthermore, in known vehicles, the heat exchange area of the main radiator, also called the high secondary radiator, also called the low temperature radiator, are fixed. The main radiator or high temperature radiator is used exclusively for cooling the equipments of the main high temperature system, whilst the secondary or low temperature radiator is used exclusively for cooling and/or heating the equipments of the secondary low temperature loop. Now, in certain engine load conditions, in particular light load conditions, it is not necessary to cool the heat engine intensely. That is why the engine cooling coolant liquid circulates through a by-pass pipeline which passes around the radiator.

Another purpose of the present invention is precisely to propose a system for managing the heat energy developed by the vehicle's heat engine which overcomes this problem and makes it possible to make the best use of the available heat exchange area for the needs of the high temperature circuit and of the low temperature circuit.

This result is achieved, according to the invention, by the fact that the interconnecting means are capable of forming configurations of the main system and of the secondary loop such that a part or the totality of the heat exchange area of the main radiator and/or of the heat exchange area of the secondary radiator are included selectively, either exclusively in the main system, or exclusively in the secondary loop, or simultaneously in the main system and in the secondary loop, depending on at least one control parameter of the load state of the heat engine of the motor vehicle.

The control parameter can be chosen, in particular, from the group comprising the temperature of the engine cooling coolant fluid, the engine load, the engine speed, the power expelled by the heat engine into the coolant fluid, or a combination of the values of these parameters.

It is thus possible to vary the distribution of the overall heat exchange area of the system, that is to say the sum of the exchange area of the main radiator and of the secondary radiator, depending on the needs of the high temperature and low temperature cooling circuits. It is thus possible to increase the heat exchange area available for the high temperature circuit by reducing the cooling area available for the low temperature circuit. Conversely, it is possible to reduce the heat exchange area allocated to the high temperature circuit, which makes it possible simultaneously to increase that of the low temperature circuit. In particular, when the engine does not need to be cooled intensely, a greater cooling capability can be assigned to the low temperature circuit and therefore a better performance level is achieved for cooling the equipments of the low temperature circuit.

The invention can be generalized to the case where the motor vehicle would comprise more than two cooling circuits, for example three of them. The system for managing heat energy according to the invention could therefore comprise three heat exchange sections and the overall heat exchange area of the module could be distributed between these three heat exchange sections according to requirements.

In a particular embodiment of the management system for the invention, the change from one configuration to another is carried out by a continuous variation of the heat exchange area.

In another particular embodiment, the main radiator and/or the secondary radiator are divided into at least two separate heat exchange sections, the change from one configuration to the other being carried out in increments, by the switching of a heat exchange section from one circuit to the other.

In this latter case, the heat exchange areas of the main exchanger included in the main system and/or the heat exchange areas of the secondary exchanger included in the secondary loop are connected in parallel with each other. Otherwise, as a variant, they are connected in series with each other.

Advantageously, the main system comprises a three-way thermostatic valve, a first way being connected to the engine pipeline, a second way being connected to a short-circuit pipeline, a third way being connected to a main cooling radiator pipeline. This thermostatic valve, whose functioning is conventional, makes it possible to cause the cooling fluid of the engine to circulate intermittently between the by-bass or short-circuit pipeline and the main radiator pipeline.

In another embodiment of the management system of the invention, the main system comprises a four-way valve, a first way of this valve being connected to an engine pipeline, a second way of the valve being connected to a short-circuit pipeline, a third way being connected to a main radiator pipeline and a fourth way being connected to a heating pipeline.

This latter solution allows a more precise management of the heat energy. In fact, with a three-way valve, the cooling fluid continuously transits the heating radiator of the passenger compartment of the motor vehicle, even if the latter is not used. The use of a four-way valve makes it possible to shut off the circulation of the fluid in the passenger compartment heating radiator when it is not necessary. The wear of the heating radiator by the circulation of a corrosive fluid is thereby slowed down.

In a preferred embodiment, the main radiator and/or secondary radiator are part of a heat exchange module comprising a first heat exchanger and a second heat exchanger each one having an inlet collector box and an outlet collector box, the first heat exchanger and the second heat exchanger being superimposed in such a way as to be traversed by the same flow of air, the outlet collector box of the first heat exchanger being connected with the inlet collector box of the second heat exchanger by a connecting orifice, valve means making it possible to open or to close the connecting orifice.

According to a first embodiment of the invention the interconnecting means are capable of forming a cold start configuration comprising a main cold start loop and a secondary cold start loop that are isolated from each other, the main radiator and the secondary radiator being included in the secondary cold start loop; and a normal operating configuration in which the circulation of the coolant fluid is carried out intermittently between the main cold start loop and the secondary cold start loop depending on the load state of the heat engine.

Advantageously, the system comprises a thermostatic valve disposed in the main cold start loop, a circulation of coolant fluid taking place between the main cold start loop and the secondary cold start loop depending on the open or closed state of the thermostatic valve.

Furthermore, according to this embodiment, the interconnecting means are additionally capable of forming a heavy load configuration in which the main system and the secondary loop are isolated from each other, the main radiator being used exclusively for cooling the main system and the secondary radiator being used exclusively for cooling the secondary loop.

Finally, the interconnecting means are additionally capable of forming a very heavy load configuration in which a circulation of coolant fluid takes place between the main system and the secondary loop, the cooling capability of the secondary radiator being used to cool the secondary loop and the heat engine simultaneously.

In this embodiment, the interconnecting means can comprise a first three-way valve included in the main system and a second three-way valve included in the secondary loop.

The invention furthermore relates to a valve system for producing the interconnection of a main system equipped with a main pump for causing a coolant cycle fluid to circulate between the heat engine and a main cooling radiator exchanging heat with the external atmospheric air, and a secondary loop including a secondary radiator and a secondary pump. It comprises a four-way valve, a first three-way valve and a second three-way valve, the four-way valve and the first three way valve being included in the main system, the second three-way valve being included in the secondary loop.

In another embodiment, the main exchanger is divided into a high temperature section permanently and exclusively included in the main system and an assignable section which can be included either in the main system or in the secondary loop, the secondary heat exchanger being included permanently in the secondary loop.

In this embodiment, the interconnecting means can be formed by two four-way valves. They can also be formed by a single valve having at least six ways.

Preferably, the six-way valve comprises a body comprising a cylindrical side wall delimiting a cylindrical housing, pipes for the inlet or the outlet of the fluid in the body, a rotary adjustment device mounted in a rotary manner about an axis in the cylindrical housing of the body, this rotary device being able to assume different angular positions for controlling the circulation of the fluid between the pipes.

Advantageously, the pipes emerge in the cylindrical side wall.

The ways of the valve can all be placed at a same level. Otherwise, they can be placed at several levels, for example two levels. It is then necessary to provide an additional way making it possible to establish connection between the different levels. In this case, the valve comprises at least seven ways.

In a preferred embodiment, the rotary adjustment device comprises pockets capable of connecting two or more than two pipes with each other.

The interconnecting means, for example two four-way valves or a single valve, capable of forming at least one start and moderate load operating configuration in which the assignable section is included in the secondary loop and a heavy or very heavy load configuration in which the assignable section is included in the main system.

In a third embodiment, the system for managing the heat energy developed by a heat engine of a motor vehicle comprises a main radiator and a secondary radiator, each one comprising a unique heat exchange section, the interconnecting means making it possible to form either a light and medium load configuration in which the main radiator is included exclusively in the main system and the secondary radiator is included exclusively in the secondary loop, or a heavy load configuration in which the main radiator and the secondary radiator are connected in parallel and are simultaneously part of the main system and of the secondary loop.

In a variant embodiment, the interconnecting means are constituted by two-way valves fitted between the main radiator and the secondary radiator.

Advantageously, the interconnecting means are constituted by connecting orifices provided between the collector box of the main exchanger and the collector box of the secondary exchanger, and by valves which make it possible to open or to close these orifices selectively.

The valve can be controlled by a thermal jack composed of a wax expansion element activated by a thermistor.

In a particular embodiment, the jack is incorporated into the pipes of the water box.

Advantageously, the interconnecting means are capable of forming a cold start configuration comprising a main cold start loop and a secondary cold start loop isolated from each other, the main radiator and the secondary radiator being included in the secondary loop; and a normal operating configuration in which a circulation of coolant fluid is carried out intermittently between the main cold start loop and the secondary cold start loop depending of the load state of the heat engine.

In a particular variant, the system comprises a thermostatic valve disposed in the main cold start loop, a circulation of coolant fluid taking place between the main cold start loop and the secondary cold start loop depending on the open or closed state of the thermostatic valve.

Also advantageously, the interconnecting means are furthermore capable of forming a heavy load configuration in which the main system and the secondary loop are isolated from each other, the main radiator being used exclusively for cooling the main system and the secondary radiator being used exclusively for cooling the secondary loop.

Thus, the main radiator is sized only to dissipate, as a maximum, a certain fraction, for example 80%, of the heat flow rejected into the water by the heat engine.

The interconnecting means are furthermore capable of forming a very heavy load configuration in which a circulation of coolant liquid takes place between the main system and the secondary loop, the cooling capability of the secondary radiator being used for cooling the secondary loop and the heat engine simultaneously.

This very heavy load configuration is advantageous because it makes it possible to dispose a smaller main radiator, which is therefore less expensive to manufacture, at the front face of the vehicle. Furthermore, if the main radiator is smaller, it is possible to consider a larger secondary radiator which provides better dissipation of heat energy in the secondary circuit and therefore better efficiency, for example of the vehicle's air conditioning system.

Other additional or optional characteristics of the invention are listed hereafter:
- the main system comprises an engine pipeline in which the main pump and the heat engine are fitted, a heating pipeline in which the air heater is fitted, a main radiator pipeline in which the main radiator is fitted and a short-circuit pipeline, the engine pipeline, the heating pipeline, the main radiator pipeline and the short-circuit pipeline being connected in parallel.
- the engine pipeline, the heating pipeline, the main radiator pipeline and the short-circuit pipeline are connected in parallel between one pipe and another pipe.
- a thermostat is placed between the engine pipeline and the other pipe.
- the secondary loop comprises a secondary radiator pipeline in which are fitted the secondary radiator and a secondary circulation pump, and a pipeline.
- the main system and the secondary loop each comprise an expansion vessel.
- the main system and the secondary loop comprise a common expansion vessel.
- the main system comprises an engine pipeline in which are fitted the main pump and the heat engine, a heating pipeline in which is fitted the air heater, a main radiator pipeline in which are fitted the main radiator and a short-circuit pipeline, the engine pipeline, the heating pipeline, the main radiator pipeline and the short-circuit pipeline being connected in parallel.
- the engine pipeline, the heating pipeline, the main radiator pipeline and the short-circuit pipeline are connected in parallel between a pipe and another pipe.
- the secondary loop comprises a secondary radiator pipeline in which are connected the secondary radiator and a secondary circulation pump, and a pipeline.

Other characteristics and advantages of the invention will furthermore become apparent on reading the following description given with reference to the appended figures. In these figures:

FIG. 1 is a block diagram of a system for managing the heat energy dissipated by a heat engine of a motor vehicle according to the present invention; FIG. 1A shows the equipment exchangers forming part of the main system; FIG. 1B shows the equipment heat exchangers forming part of the secondary loop;

-FIG. 25 shows the upper level of the valve, whilst FIG. 26 shows the lower level of the valve;

Figure 1:
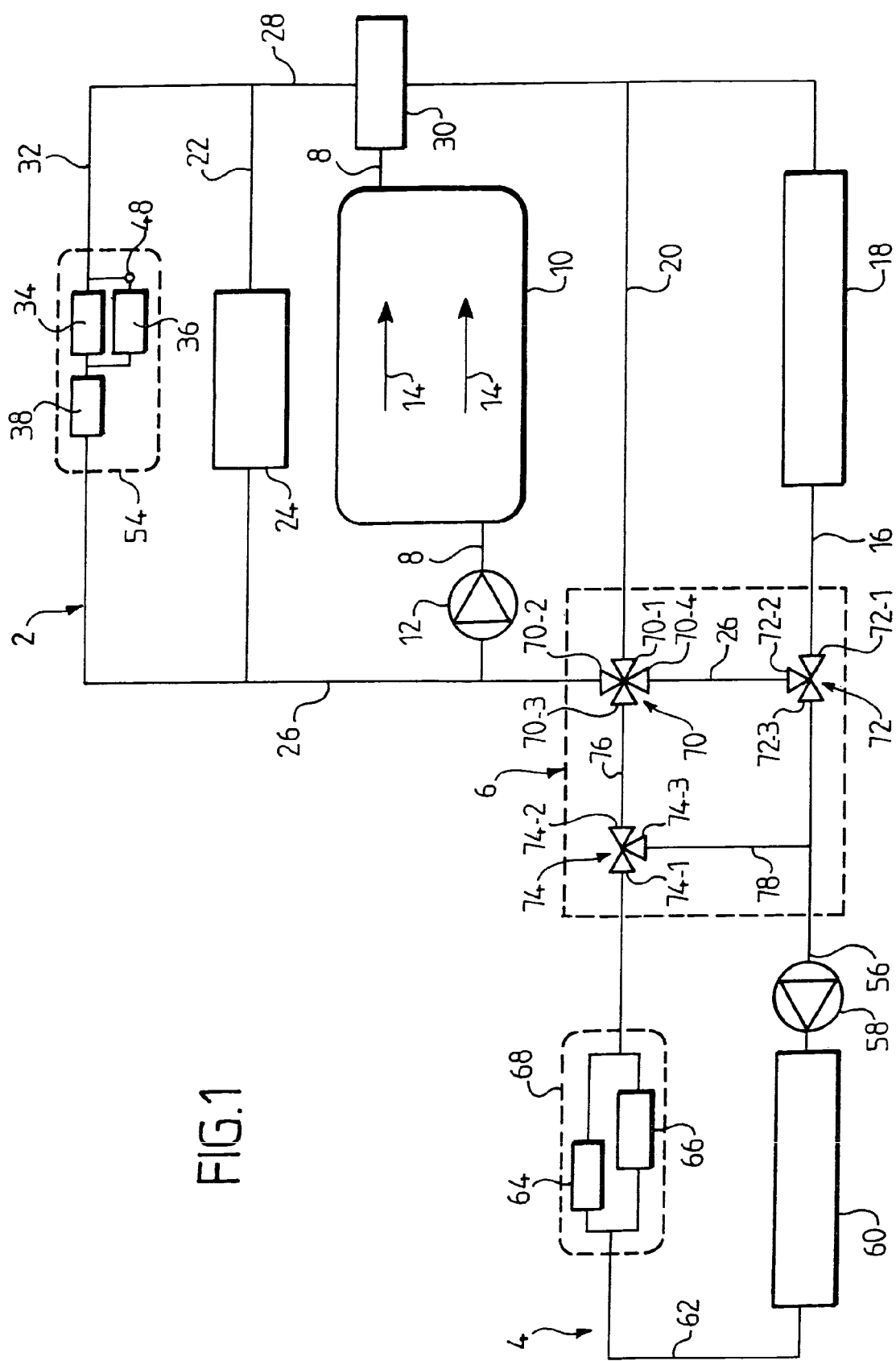

FIG. 1 is an overall view of a system for managing the heat energy released by a heat engine according to the present invention. This system comprises a main system, indicted by the general reference 2, a secondary loop, indicated by the general reference 4, and interconnecting means, indicated by the general reference 6, disposed between the main system 2 and the secondary loop 4.

The main system 2 comprises an engine pipeline 8 connected to the heat engine 10 of the vehicle. A mechanical or electric pump 12 feeds the cooling circuit of the engine 10 with coolant fluid, as represented by the arrows 14. The main system also comprises a radiator pipeline 16 to which is fitted a main radiator 18 traversed by the coolant fluid. A short-circuit pipeline 20 is connected in parallel with the radiator pipeline 16.

The main system 2 also comprises a heating pipeline 22 to which is connected an air heater 24. The pipelines 8, 16, 20 and 22 are connected to pipes 26 and 28. A thermostat 30, or an electric and/or pneumatic thermostatic valve, is fitted to the connection of the engine pipeline 8 and the pipe 28. The thermostat 30 is sensitive to the temperature of the coolant liquid. Below a threshold temperature, for example 100° C., the thermostat 30 is closed and the coolant fluid which comes out of the engine through the pipeline 8 is directed exclusively to the air heater 24. On the contrary, when the temperature of the coolant fluid exceeds this threshold value, the fluid can circulate in both branches of the pipe 28 and also be directed to the main radiator 18 and the short-circuit pipeline 20.

Optionally, the main system 2 can comprise a branch 32 of equipment exchangers if the vehicle is equipped with additional equipments such as a circulation oil cooler or an exhaust gas cooler. In this case, according to the invention, these additional equipments are cooled, or heated if appropriate, by the intermediary of equipment exchangers, which exchange heat with the coolant fluid which circulates in the main system.

Figure 1A:
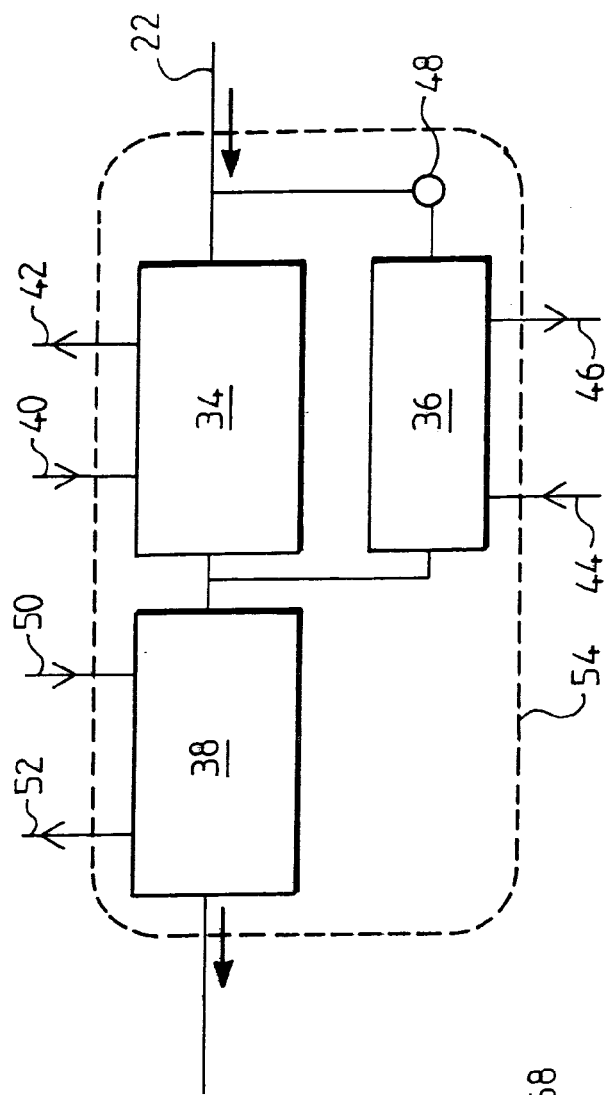

In the example shown in FIG. 1, the main system comprises three equipment exchangers, namely an oil cooling radiator 34, a fuel heater 36 connected in parallel with the oil cooler 34, and an exhaust gas cooler 38 connected in series with the oil cooler 34 (see FIG. 1A). Other series and/or parallel configurations are also possible. An oil pipeline 40 brings the hot oil coming from the oil circuit to the oil cooling radiator, and an oil outlet pipeline 42 returns the cooled oil to the oil circuit. In the same way, a fuel inlet pipeline 44 brings the cold fuel to the fuel heater 36 and a heated fuel output pipeline 46 takes the fuel to the engine. A thermostatic capsule 48 makes it possible to interrupt the branch in which the fuel heater 36 is connected according to the temperature of the fuel. Similarly, a pipeline 50 brings the hot exhaust gasses to the exhaust gas cooler 38 and an output piping 52 returns the cooled exhaust gasses to an inlet manifold. The exhaust gas cooler 38 makes it possible to reduce the pollution of the engine. It furthermore makes it possible to retrieve heat from the exhaust gasses, which accelerates the rise in temperature of the engine during the start phase.

The exchangers 34, 36 and 38 have been surrounded by a rectangle 54 with rounded corners and dawn in dashed line to indicate that these equipments are optional.

Figure 1B:
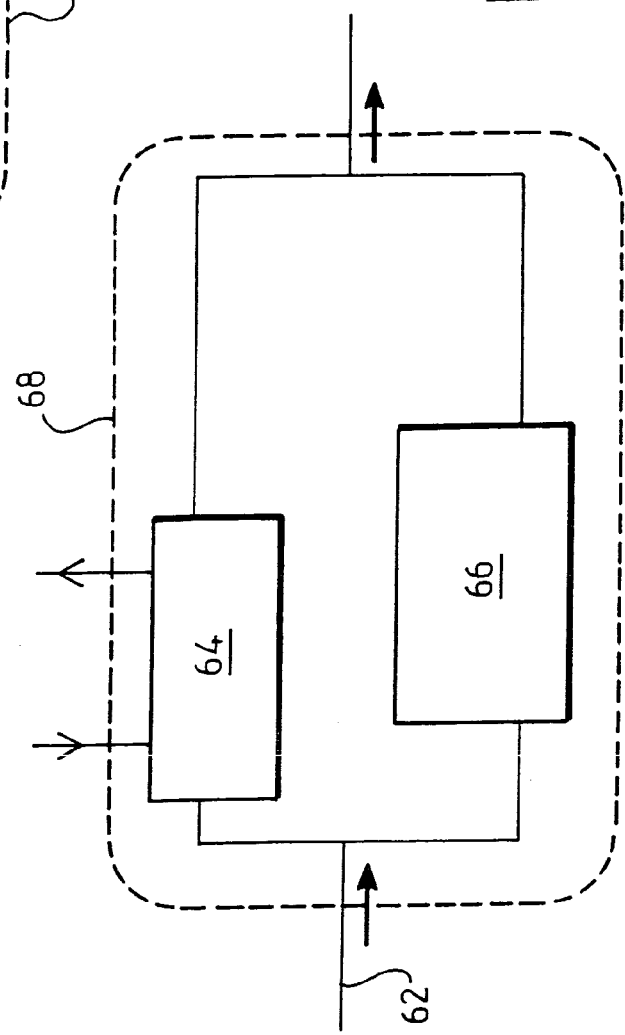

The secondary loop 4 comprises a secondary radiator pipeline 56 in which are connected a secondary circulation electric pump 58 and a secondary radiator 60. It also comprises a pipeline 62. In the same way as for the main system 2, the secondary loop 4 can comprise radiators intended for cooling or possibly for heating secondary equipments of the vehicle. In the example shown, the vehicle comprises an air conditioning circuit. The condenser 64 of the air conditioning circuit is fitted in the secondary loop 4 (see also FIG. 1B). It is cooled by heat exchange with the coolant fluid which circulates in this loop.

The vehicle is also equipped with a supercharging air cooler 66 (FIGS. 1 and 1B) which makes it possible to lower the temperature of the air prior to its introduction into the engine. Whereas, in general, the supercharging air cooler is an air-to-air exchanger, according to the invention this cooler 66 is an air-to-liquid cooler, the supercharging air is cooled by heat exchange with the cycle of coolant fluid which circulates in the secondary loop 4. The air conditioning condenser 64 and the supercharging air cooler 66 are connected in parallel or in series. These two exchangers have been shown surrounded by a rectangle 68 with rounded corners and drawn in dashed line to indicate that they are optional.

The main system 2 and the secondary loop 4 are connected by the interconnecting means 6 which make it possible to isolate the main system form the secondary loop or, on the contrary, to ensure a circulation of fluid between them. In the example shown, the interconnecting means are constituted by a four-way valve 70 and by a first three-way valve 72 and a second three-way valve 74. The four-way valve 70 and the first three-way valve 72 are included in the main system 2. They are connected to the pipeline 26.

A first way 70-1 of the valve 70 is connected to the short-circuit pipeline 20, a second way 70-2 is connected to the pipeline 26, on its part nearest the heat engine 10, a third way 70-3 is connected to a pipe 76 which connects the four-way valve 70 to the second three-way valve 74. Finally the fourth way 70-4 of the valve 70 is connected to the part of the pipeline 26 which connects the valve 70 and the valve 72.

The valve 72 comprises a first way 72-1 connected to the main radiator pipeline 16, a second way 72-2 connected to the pipe 26 and a third way 72-3 connected to the secondary radiator pipeline 56.

Finally, the second three-way valve 74 comprises a first way 74-1 connected to the pipeline 62, a second way 74-2 connected to the pipe 76 and a third way 74-3 connected to a pipe 78 connected in a T connection to the pipeline 56.

The valves 70, 72 and 74 are controlled by means sensitive to temperature, such as temperature probes which pick up the temperature of the coolant fluid at various places in the main system and in the secondary loop 4.

In FIG. 1, the main radiator 18 and the secondary radiator 60 have been shown as two separate elements. An embodiment of this type is possible. The two exchangers can be disposed side by side or, preferably, one behind the other, in such a way as to reduce their volume requirement under the hood. When the exchangers are disposed one behind the other, they can form part of a heat exchange module comprising two or more than two exchangers having common cooling fins.

As a variant and according to the invention, the main radiator 18 and the secondary radiator 60 can advantageously form part of a multi-function heat exchange module. This means a heat exchange module comprising two or more than two heat exchangers superimposed in such a way as to be traversed fully or partially by a same flow of air. Each exchanger has an inlet collector box and an outlet collector box. The outlet collector box of the first heat exchanger is connected with the inlet collector box of the second heat exchanger by a connecting orifice. Valve means make it possible to open or close this connecting orifice depending on certain parameters of the heat energy management system, such as the temperature of the coolant fluid at various points in the circuit. The valve means thus make it possible to put all or part of the capability of the exchangers into service and, consequently, to vary the cooling capability of the exchangers, in such a way as to adapt it as well as possible to the load conditions of the heat engine.

Figure 2:
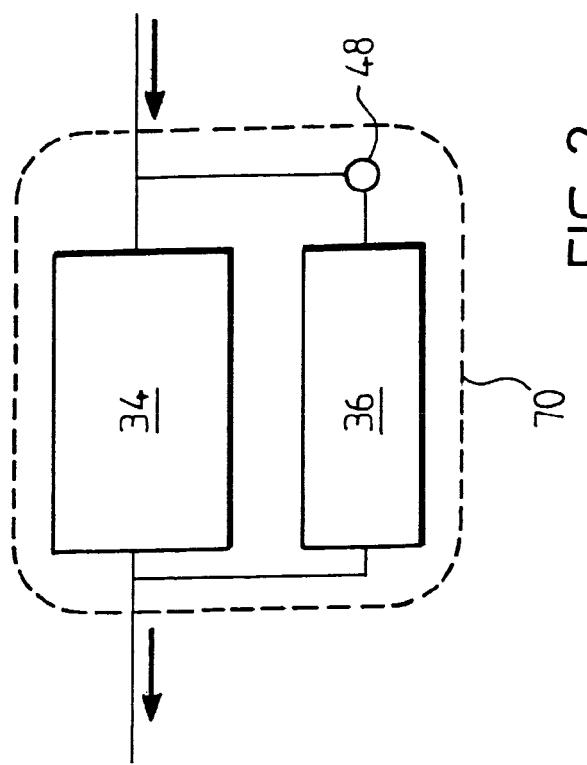
FIG. 2 shows a variant of the equipment exchangers forming part of the main system.
Figure 3:
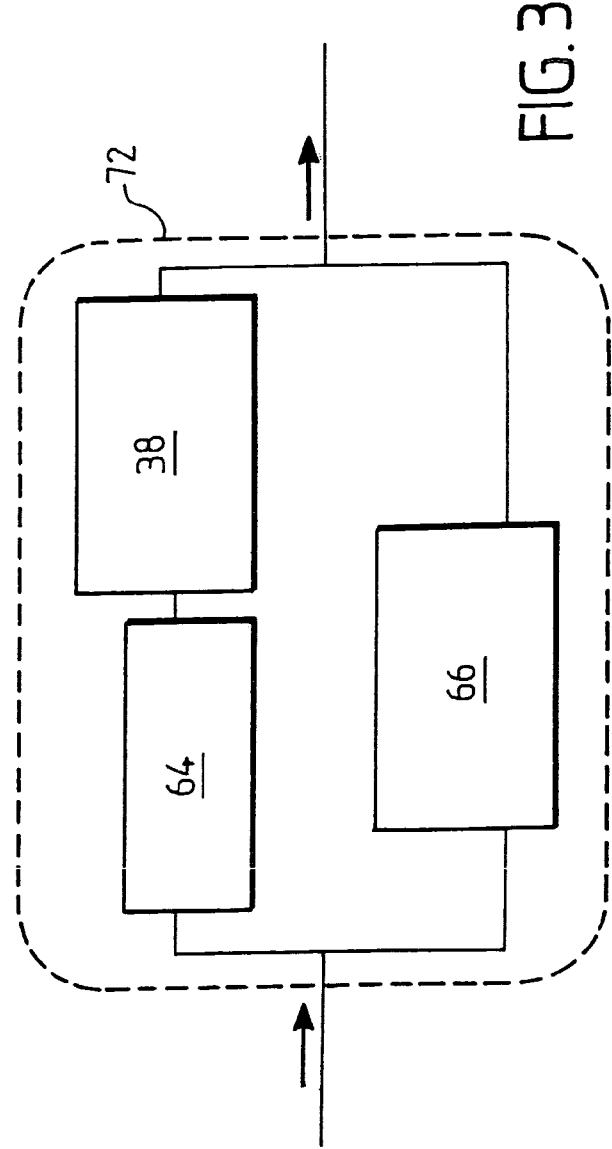
FIG. 3 shows a variant of the equipment heat exchangers forming part of the secondary loop.

FIG. 2 shows a variant, indicated by the general reference 70, of the equipment exchangers of the main system 2, and FIG. 3 shows a variant, indicated by the general reference 72, of the equipment exchangers of the secondary loop 4 of the energy management system of a heat engine shown in FIG. 1. In FIG. 1, the exhaust gas cooling exchanger 38 is installed in the main system. This arrangement corresponds to the conventional arrangement used in present-day cooling circuits. On the contrary, in FIGS. 2 and 3, the exhaust gas cooler 38 is installed among the equipment exchangers (the dashed line rectangle 72) of the secondary loop 4. Due to this feature, the exhaust gasses are even better cooled, which results in further reducing the emissions of pollutants.

Advantageously, the secondary radiator 60 is disposed in front of the main radiator 18, such that the air traverses it first. The radiator 60 is therefore better cooled than the main radiator 18 since the air which penetrates into the latter is already heated up in passing through the secondary radiator 60. Consequently, the temperature of the coolant fluid in the secondary loop 4 is lower than the temperature of that same cycle fluid in the main system 2. The secondary loop 4 therefore constitutes a low temperature loop and the radiator 60 constitutes a low temperature radiator. Similarly, the equipment exchangers 64 and 66 included in the secondary cooling loop 4 constitute low temperature exchangers. Conversely, the main radiator 18 is a high temperature radiator, the expression "high" having to be understood as being relative to the temperature of the fluid in the secondary loop 4. The main system 2 constitutes a high temperature system, and the exchangers 34, 36 and 38 included in the main system 2 constitute a group of high temperature exchangers 54.

Figure 4:
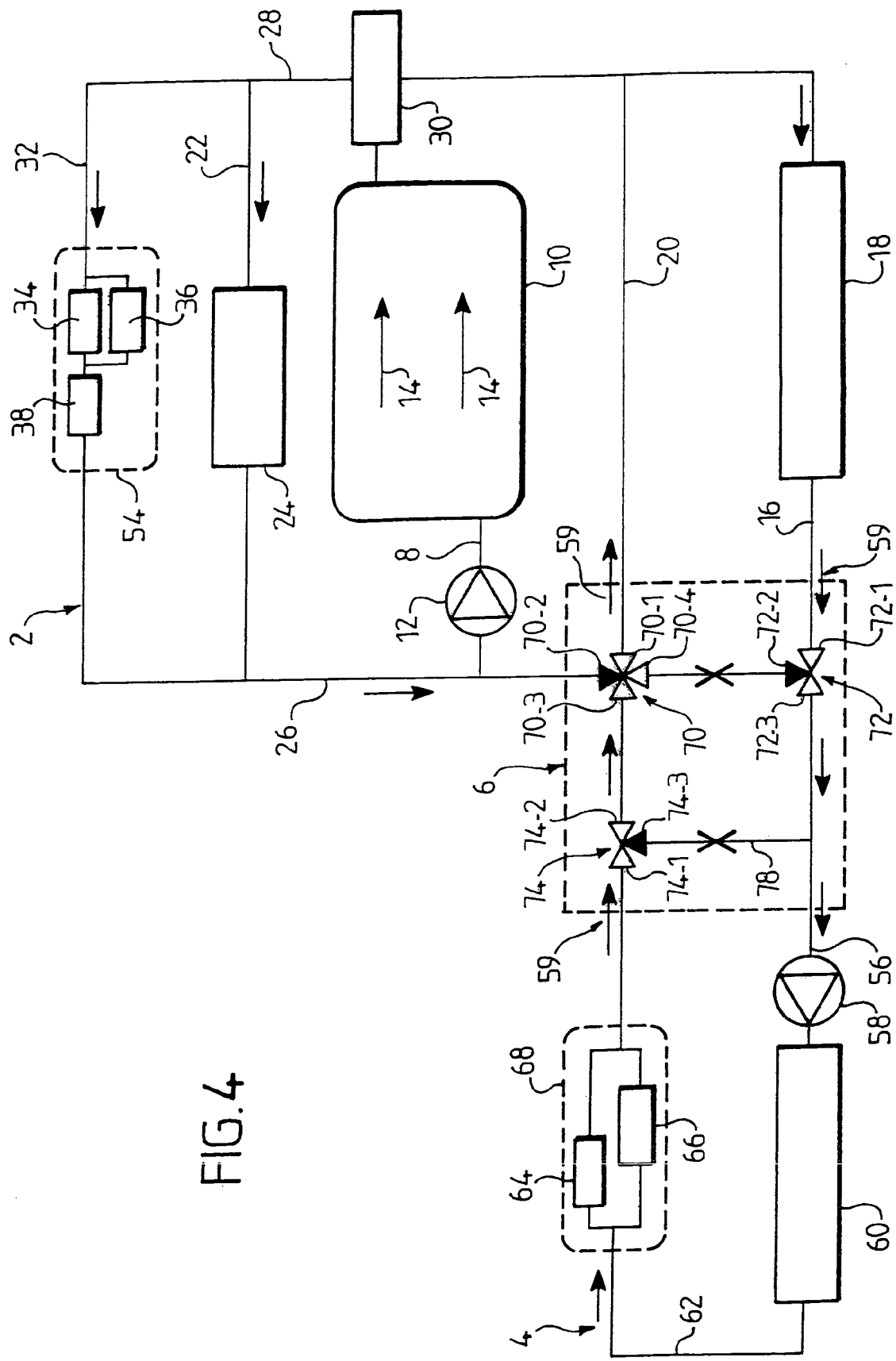
FIG. 4 is a block diagram of the system for managing heat energy shown in FIG. 1 in the cold start configuration.

FIG. 4 shows the heat energy management system of FIGS. 1 to 3 in the cold start configuration. It is desirable for the heat engine 10 to reach its normal operating temperature as quickly as possible after starting. In fact, the engine is designed to operate at this temperature, and in particular in order to pollute the atmosphere less. That is why the engine is not cooled. On the contrary, it is heated, when it is possible, in order to further accelerate its rise in temperature. The thermostat or the thermostatic valve 30 is closed. Similarly, the second way 70-2 of the valve 70 is closed. In this way a main loop is delimited in the main system 2. This loop comprises the heat engine pipeline 8, the heating pipeline 22 and the part of the pipes 26 and 28 that connects these two pipelines. In the case in which the main system comprises one or more equipment exchangers, as represented by the rectangle with rounded corners 54 drawn in dashed line, the main loop furthermore comprises the equipment exchangers branch 32 connected in parallel with the heating pipeline 22.

The equipment exchangers represented by the rectangle 54 can comprise, for example, the three exchangers 34, 36 and 38 shown in FIG. 1, or the exchangers 34 and 36 shown in FIG. 2. Other variants are also conceivable. The coolant cycle fluid thus circulates in a closed loop. If the heating of the vehicle, that is to say the air heater, in not in operation, the totality of the heat energy released by the engine 10 is used for heating the engine. If the main system comprises an exhaust gas cooling exchanger 38, the heat of the exhaust gasses is also retrieved for further raising the temperature of the coolant cycle fluid and to accelerate the rise in temperature of the engine 10. Furthermore, the ways 74-1 and 74-2 of the valve 74, the ways 70-1 and 70-3 of the valve 70 and the ways 72-1 and 72-3 of the valve 72 are open (the other ways being closed).

The interconnecting means 6 thus delimit a secondary circulation loop which comprises the radiator pipeline and the main radiator 18, or high temperature radiator, the short-circuit pipeline 20 and the part of the pipe 28 connecting the radiator pipeline 16 and the short-circuit pipeline 20, the pipeline 62 and the secondary radiator or low temperature radiator 60 pipeline. The electric circulation pump 58 causes the coolant cycle fluid to circulate in the secondary loop in the clockwise direction, as indicted by the arrows 59. The loop can comprise one or more optional equipment exchangers, as represented by the rectangle drawn in dashed line 68. These exchangers can be, for example, the exchangers 64 and 66 shown in FIG. 1, or the exchangers 64, 66 and 38 as shown in FIG. 3. It can also comprise other exchangers.

In this cold start configuration, the cooling capability of the main radiator and of the secondary radiator 60 are added together in order to cool the equipments of the group 68. When the vehicle is equipped with an air conditioning system, the efficiency of the latter is increased due to the cooling efficiency of the air conditioning condenser 64. If the equipment exchangers 68 comprise an exhaust gas cooling radiator 38 (FIG. 3), the exhaust gasses are better cooled, which results in reducing the emissions of pollutants.

Figure 5:
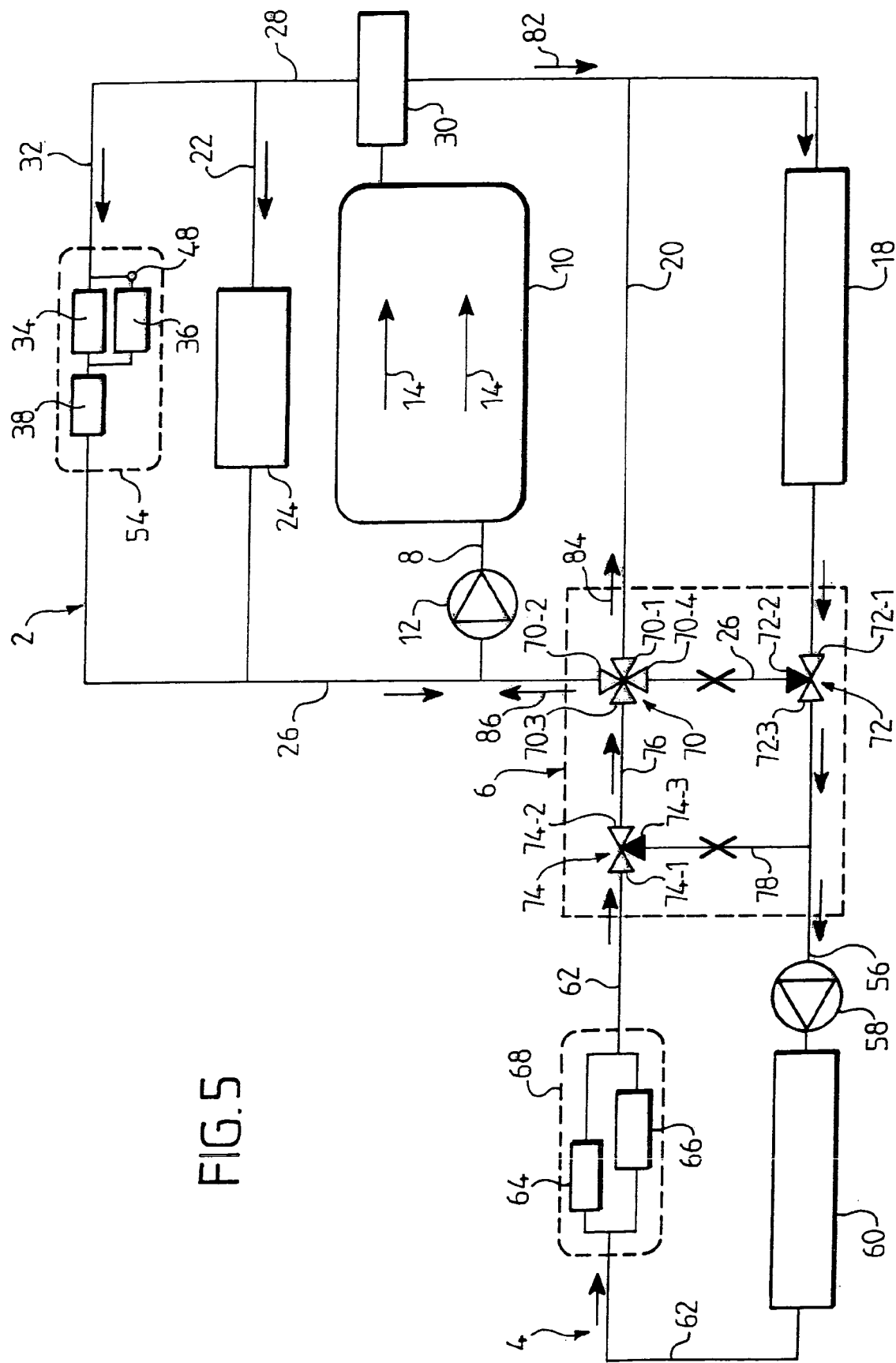
FIG. 5 is a block diagram of the system for managing heat energy shown in FIG. 1 in the normal operation configuration.

FIG. 5 shows the configuration of the heat energy management system in the normal operating configuration. The thermostat 30 regulates the circulation of the coolant cycle fluid about a set temperature, for example 100° C. When the temperature of the fluid is below 100° C., the thermostat 30 is closed. The second way of the four-way valve 70 connected to the upper part of the pipe 26 (according to FIG. 5) is also closed. The system is therefore in a configuration that is exactly identical to the cold start configuration shown in FIG. 4.

On the contrary, when the temperature of the coolant cycle fluid exceeds the set value, for example 100° C., the thermostat opens and the hot fluid leaving the heat engine 10 is distributed between the two branches of the pipe 26. Part of the fluid traverses the air heater 24 and the equipment exchangers 54. Another part of the coolant fluid is directed through the lower part of the pipe 28 (according to the figure) towards the main radiator 18, as indicated by the arrow 82. This arrow has been drawn in dashed line to indicate that the circulation is intermittent.

When the thermostat 30 is open, the second way 70-2 of the valve 70 is also open, only the fourth way 70-4 of this valve remaining closed. The flow of the two coolant fluids that arrive by the pipeline 62 is distributed between the short-circuit pipeline 20 and the pipe 26, as indicated by the arrows 84 and 86. The cold fluid which traverses the diversion pipeline is mixed again with the hot fluid leaving the engine in order to give a fluid of average temperature, and therefore cooled. The high temperature radiator 18 therefore contributes to the cooling of the equipments of the low temperature loop 2. Another portion of the fluid, as indicated by the arrow 86, is taken in by the circulation pump 12 in order to cool the heat engine 10. This fraction of the flow is low, such that the engine is not cooled much. That is why this configuration is suitable only for a light load on the heat engine.

Figure 6:
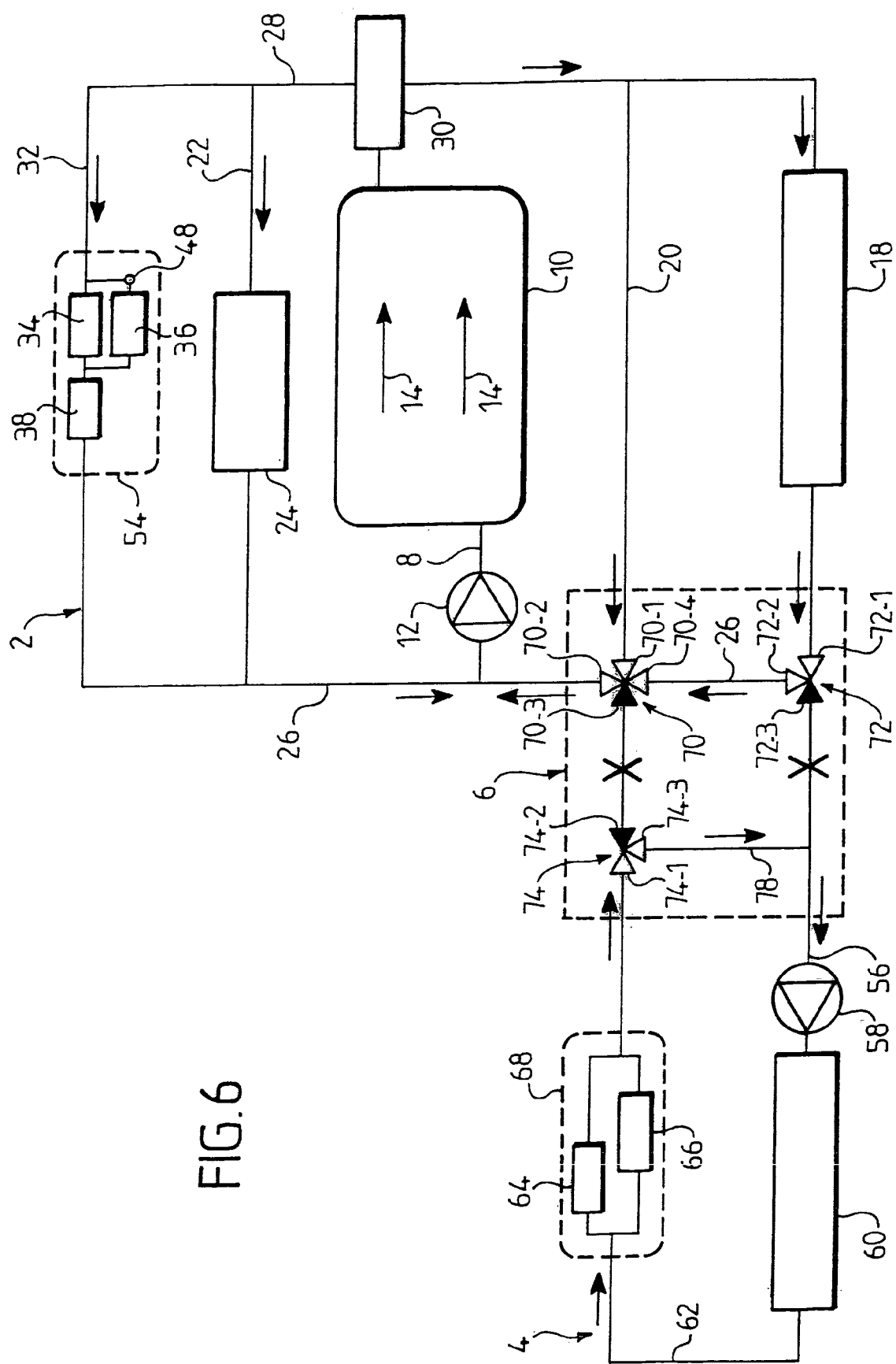
FIG. 6 is a block diagram of the system for managing heat energy shown in FIG. 1 in the heavy load configuration.

FIG. 6 shows the configuration of the heat energy management system corresponding to a critical operation, that is to say a heavy load imposed on the engine 10. In this configuration, the third way 70-3 of the valve 70 is closed, whilst the first way 70-1, the second way 70-2 and the fourth way 70-4 are open. The first way 72-1 and the second way 72-2 of the valve 72 are open and the third way 72-3 is closed. The first way 74-1 and the third way 74-3 of the valve 74 are open and the second way 74-2 is closed. Given that the load on the heat engine is heavy, the temperature of the coolant fluid is permanently above the set value and the thermostat 30 is permanently open. The coolant fluid is distributed in the two branches of the pipe 28. Part of the fluid circulates through the air heater 24 and the exchangers of the high temperature group 54, the other part of the fluid traverses the high temperature radiator 18. After having been cooled, the fluid returns into the engine through the pipe 26 and the heat engine pipeline 8. The circulation between the four-way valve 70 and the three-way valve 74 is interrupted. Similarly, the circulation between the three-way valve 72 and the secondary pump 58 is interrupted because the third way of the valve 72 is closed. The fluid therefore circulates in two entirely separate loops.

In the secondary loop 4, the coolant liquid put into circulation by the secondary pump 58 traverses the low temperature radiator 60 and, possibly, the low temperature equipment exchangers represented by the rectangle 68 drawn in dashed line, if such equipments exist. Thus, in this configuration, the main radiator 18 is used exclusively for cooling the main system 2 and the low temperature radiator 60 is used exclusively for cooling the secondary loop 4.

Figure 7:
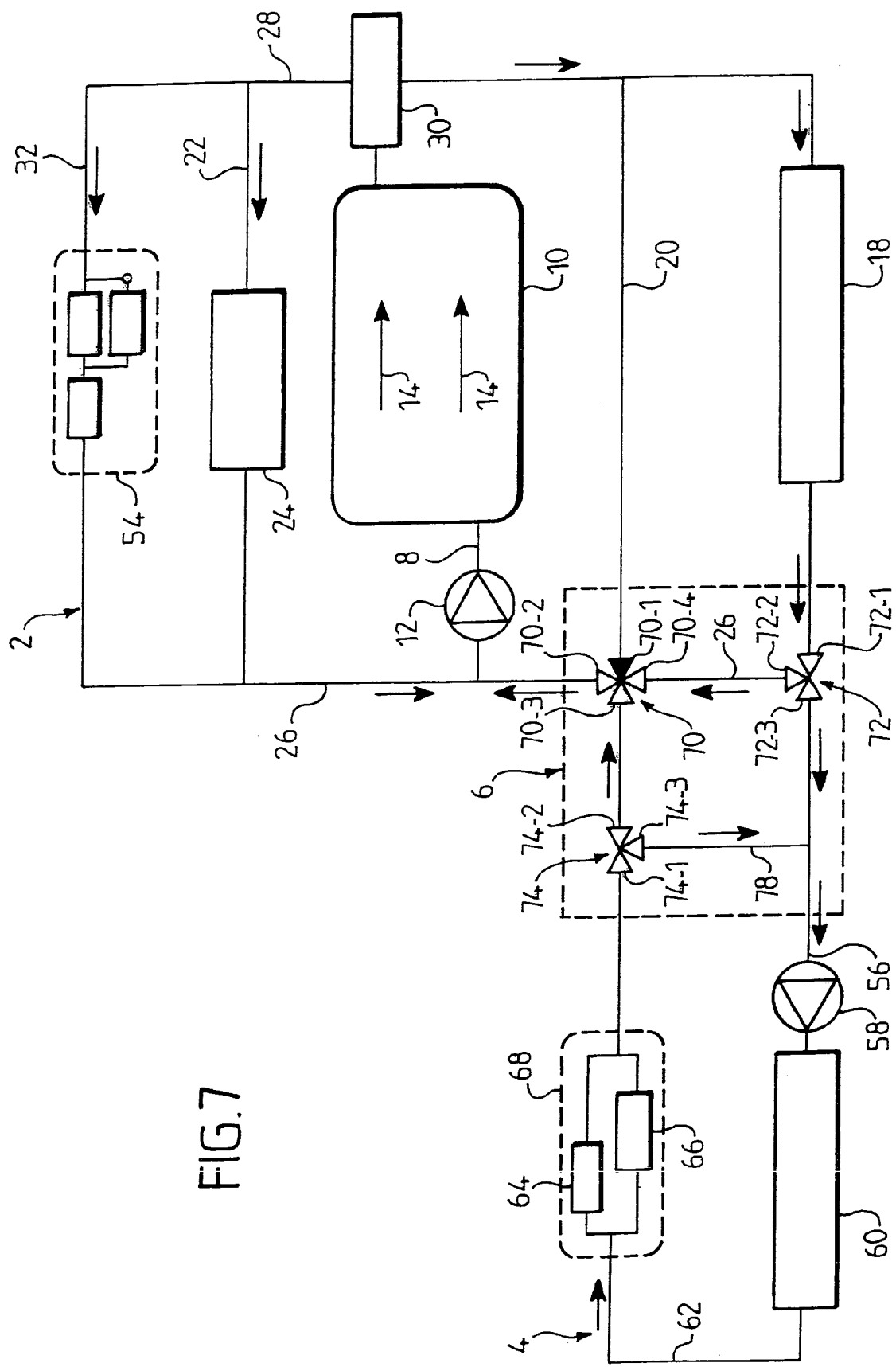
FIG. 7 is a block diagram of the system for managing heat energy shown in FIG. 1 in the very heavy load configuration.

FIG. 7 shows the configuration of the heat energy management system of the engine 10 in a case of very critical operation, that is to say in a case of very heavy load on the engine. In this configuration, the thermostat 30 is of course permanently open, such that the coolant cycle fluid which leaves the heat engine 10 is distributed between the heating branch 22 in which the air heater 24 is included and, possibly, the equipment exchangers branch 32 on the one hand and, on the other hand, the lower part (according to the figure) of the pipe 26 connected to the short-circuit pipeline 20 and to the radiator pipeline 16. In this configuration, the first way of the four-way valve 70 connected to the short-circuit pipeline 20 is closed. All of the other ways of the four-way valve 70, namely the second, third and fourth ways, are open, the three ways of the first valve 72 and the three ways of the second three-way valve 74 are also all open.

The secondary low temperature radiator 60 ensures the cooling of the low temperature equipments of the secondary loop 4 (rectangle 68 drawn in dashed line). However, part of the fluid having traversed the equipment exchangers, for example the air-conditioning condenser 64 and the supercharging air radiator 66, is routed by the pipeline 76, and then by the pipe 26, to the heat engine 10. This relatively cold fraction of the fluid contributes to the cooling of the engine. Conversely, part of the cooled fluid, after having traversed the high temperature radiator 18, is routed by the pipeline 56 to the low temperature radiator 60 in which it is even further cooled. Thus, in this configuration, the priority is given to cooling the engine. The main high temperature radiator 18 is used exclusively for cooling the engine, whilst the secondary low temperature radiator 60 is used both for cooling the equipments of the secondary low temperature loop and, in a complementary manner, for cooling the heat engine 10.

This configuration is particularly advantageous if the main high temperature radiator 18 is sized to dissipate, as a maximum, only part of the maximum heat power ejected into the water by the engine, for example 80% of it. During the normal operation or the heavy load operation of the engine, the main radiator suffices to provide the cooling. On the other hand, in the case of a very heavy load on the engine, the low temperature radiator provides complementary cooling which makes it possible to evacuate the whole of the heat power released by the engine. The high temperature radiator 18 can thus be smaller and less expensive. Its space requirement under the hood of the vehicle is reduced.

On the other hand, the secondary low temperature radiator can be sized more generously, which improves the cooling performance of the exchangers of the low temperature group 68, in particular of the air conditioning condenser.

Figure 8:
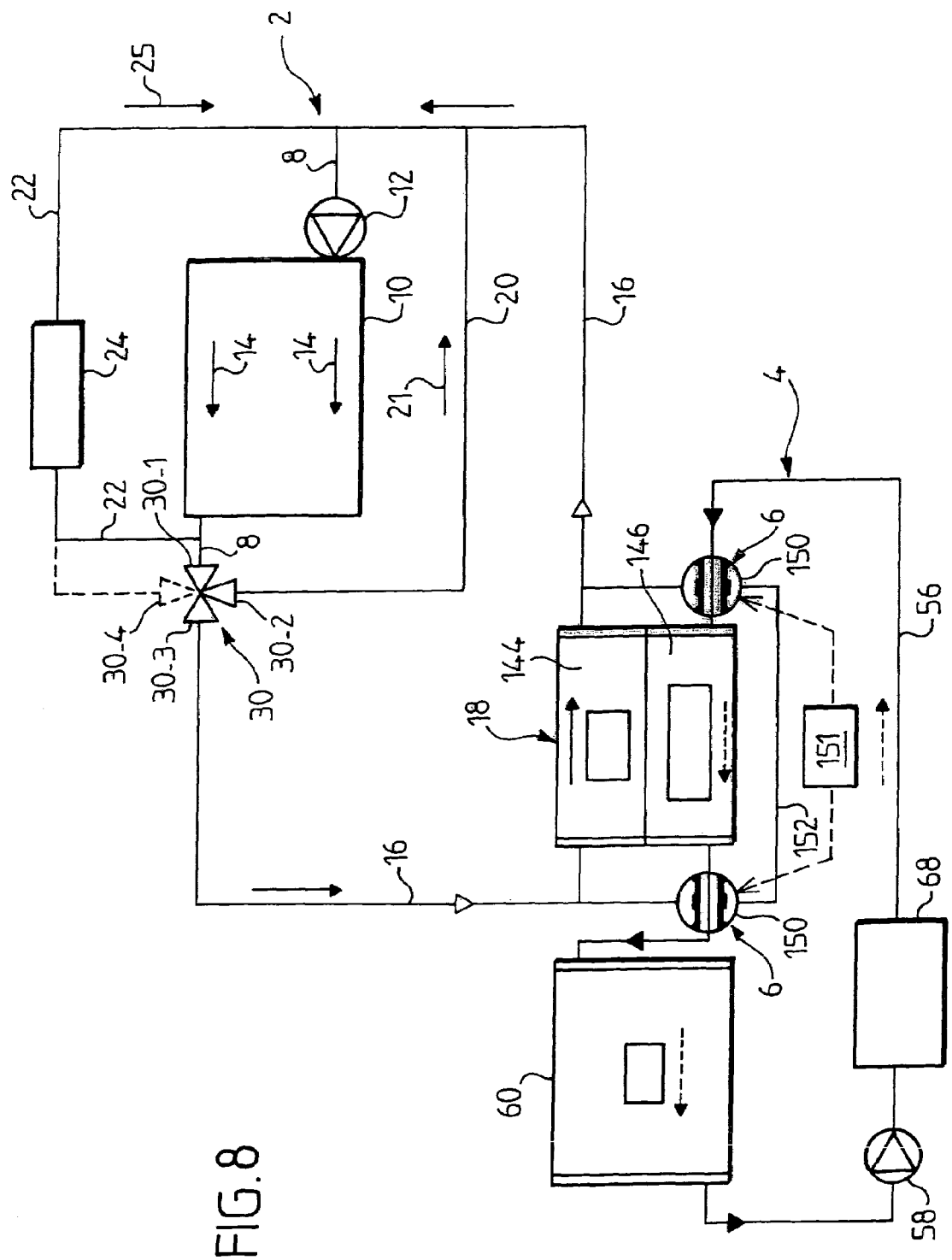
FIGS. 8 and 9 are block diagrams of a system for managing heat energy according to the invention comprising a three-way thermostatic valve and interconnecting means constituted by two four-way valves.
Figure 9:
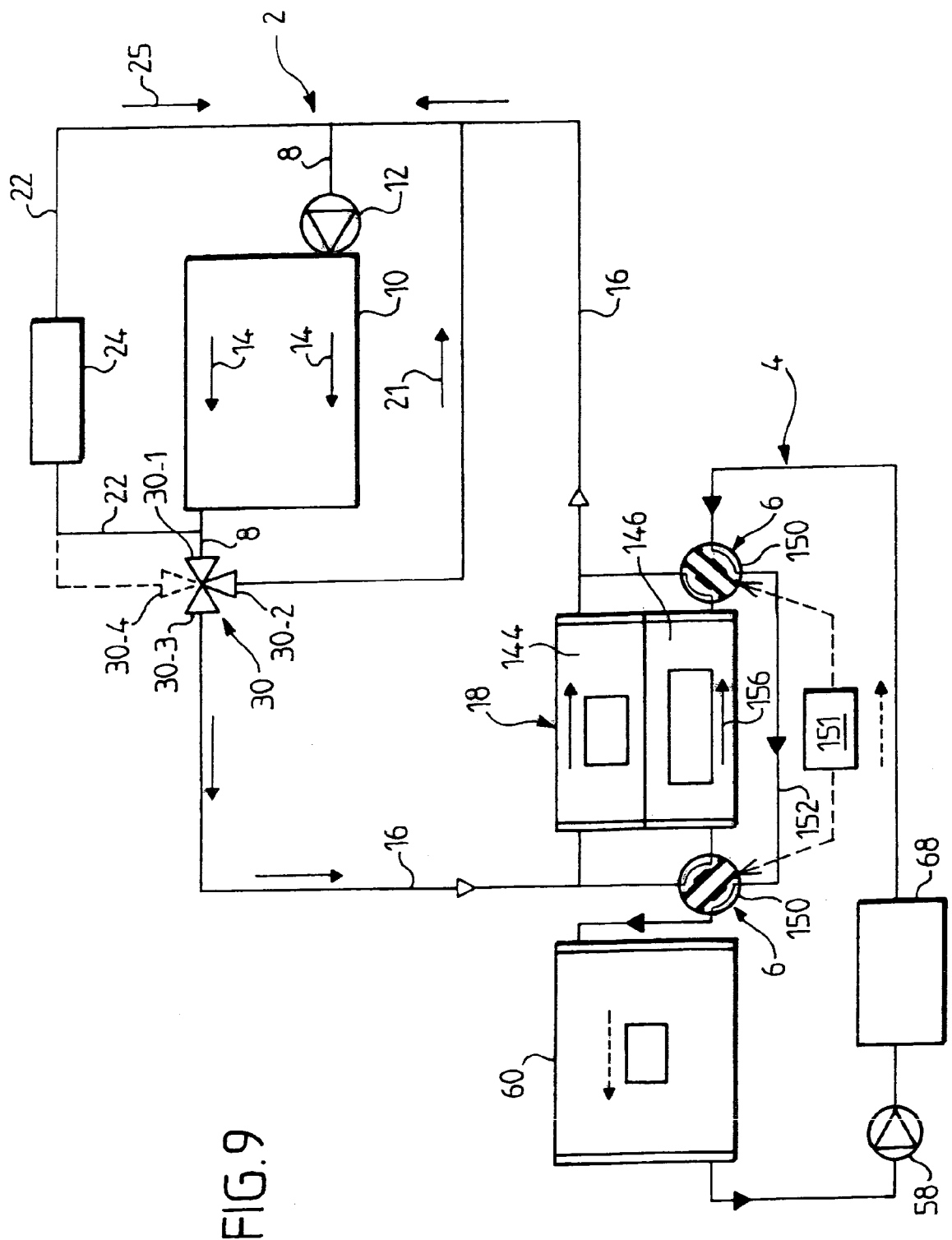

In FIGS. 8 and 9 the heat energy management system of an engine 10 is constituted, on the one hand, by a main system, indicated by the general reference 2, and by a secondary loop, indicated by the general reference 4, and interconnecting means, indicated by the general reference 6, disposed between the main system and the secondary loop 4.

The main system 2 comprises an engine pipeline 8 connected to the heat engine 10 of the vehicle and an electric or mechanical pump 12, which feeds the engine's cooling circuit (arrow 14) with coolant fluid. The main system also comprises a radiator pipeline 16 to which is connected a main radiator 18 which will be described in greater detail below. A short-circuit pipeline 20, connected in parallel with the radiator pipeline 16, makes it possible to short-circuit the radiator 18, as indicated by the arrow 21.

The main system 2 also comprises a heating pipeline 22 to which is connected an air heater 24 and a three-way thermostatic valve denoted by the general reference 30. The valve 30 comprises an input 30-1 connected to the engine pipeline 8 and two outputs 30-2 and 30-3, connected to the short-circuit pipeline 20 and to the cooling radiator pipeline 16 respectively. The three-way valve could be replaced by a four-way valve comprising a fourth way 30-4 connected to the heating pipeline 22, as indicated in dotted line in FIGS. 8 and 9.

The secondary loop 4 comprises a secondary radiator pipeline 56 to which are connected an electric secondary circulation pump 58 and a secondary radiator 60. It also comprises one or more equipment exchangers indicated by the general reference 68, intended to cool or possibly to heat secondary equipments of the vehicle. These exchangers can be constituted, as described with reference to FIGS. 1, 1A and 1B, for example by a supercharging air cooler or a condenser forming part of an air conditioning circuit of the passenger compartment of the motor vehicle.

The main system and the secondary loop 4 are connected by interconnecting means indicted by the general reference 6 which make it possible to isolate the main system 2 from the secondary loop or, on the contrary, to ensure a circulation of the coolant fluid between these two circuits. In the example shown in FIGS. 8 and 9, the interconnecting means are constituted by two four-way valves 150.

According to another characteristic of the invention, the main radiator 18 is divided into two parts, namely a part 144 constituting a high temperature heat exchange section used for cooling the main system, and in particular the heat engine 10, and a heat exchange section 146, called an assignable section, constituted by the tubes of the exchanger 18 that do not belong to the section 144. The high temperature heat exchange section is permanently included in the main system 2. It is connected to the previously described pipeline 16. On the contrary, the assignable heat exchange section 146 can be included, depending on the position of the interconnecting means 6, that is to say of the two four-way valves 150, either to the main high temperature system 2 or to the secondary low temperature loop 4.

The functioning of the heat energy management system shown in FIGS. 8 and 9 will now be described. When the vehicle is started, the cooling fluid is cold. It is desirable to achieve a rapid warming of the engine. This is the reason why the latter is not cooled. The way 30-3 of the thermostatic valve 30 is closed and the way 30-2 is open, such that the coolant fluid circulates in a closed loop, passing through the short-circuit pipeline 20 without being cooled. Furthermore, the air heater 24 is permanently fed with hot coolant fluid leaving the engine 10 in order to heat the passenger compartment of the vehicle. In the variant embodiment comprising one for-way valve shown in dashed line in FIGS. 8 and 9, it is possible to interrupt the circulation of the coolant fluid in the air heater 24 by closing the way 30-4 of the four-way valve. The totality of the coolant fluid therefore passes through the short-circuit pipeline 20.

When the coolant fluid has reached a certain temperature, for example 90° C., the coolant fluid circulates intermittently between the short-circuit piping 20 and the cooling radiator pipeline 16, in such a way as to be cooled in the high temperature heat exchange section 144. In this start and light or medium load configuration, the valves 150 are in the position shown in FIG. 8. The assignable heat exchange section 146 is connected in parallel with the secondary low temperature radiator 60. The cooling capabilities of the section 146 and of the radiator 60 are added together, which allows better functioning of the equipment exchangers 68, for example of the air-conditioning circuit.

Above a certain critical temperature $T_c$ of the cooling fluid of the engine 10, for example 105° C., it is necessary to cool the main system 2 more intensely. The interconnecting means, that is to say the two four-way valves 150, are therefore actuated in such a way as to obtain the heavy load configuration shown in FIG. 9 corresponding to operation at a temperature higher than the critical temperature $T_c$. In this configuration, as mentioned above, the high temperature heat exchange section 144 remains included in the main system 2. However, the assignable section is connected in parallel with the section 144 such that the totality of the cooling capability of the main exchanger is applied to the main system 2. For this purpose, the valves 150 are controlled in such a way that the fluid that circulates in the secondary loop 4 passes through a diversion pipeline 152 which passes around the assignable heat exchange section 146 and, simultaneously, this assignable section 146 is connected in parallel with the section 144 to the cooling exchanger pipeline 16 (arrow 156).

In both of the configurations that have just been described with reference to FIGS. 8 and 9, the valves 150 determine two separate systems, isolated from each other. The assignable heat exchange section 146 is assigned either to the main system 2, or to the secondary loop 4, but it is never assigned to both of them simultaneously. However, as will be seen in other embodiments, the assignable section can be common to the main system and to the secondary loop.

The change from one configuration to another of the valves 150 is provided by control means 151 which act according to at least one control parameter of the load state of the engine 10 of the vehicle. In the described example, this control parameter is the is temperature of the engine's cooling fluid. However, this parameter could also be the load or the speed of the engine, the power ejected by the engine into the cooling fluid, or even a combination of several of these parameters. The control means 151 can be driven electrically, pneumatically or even thermostatically.

Figure 10:
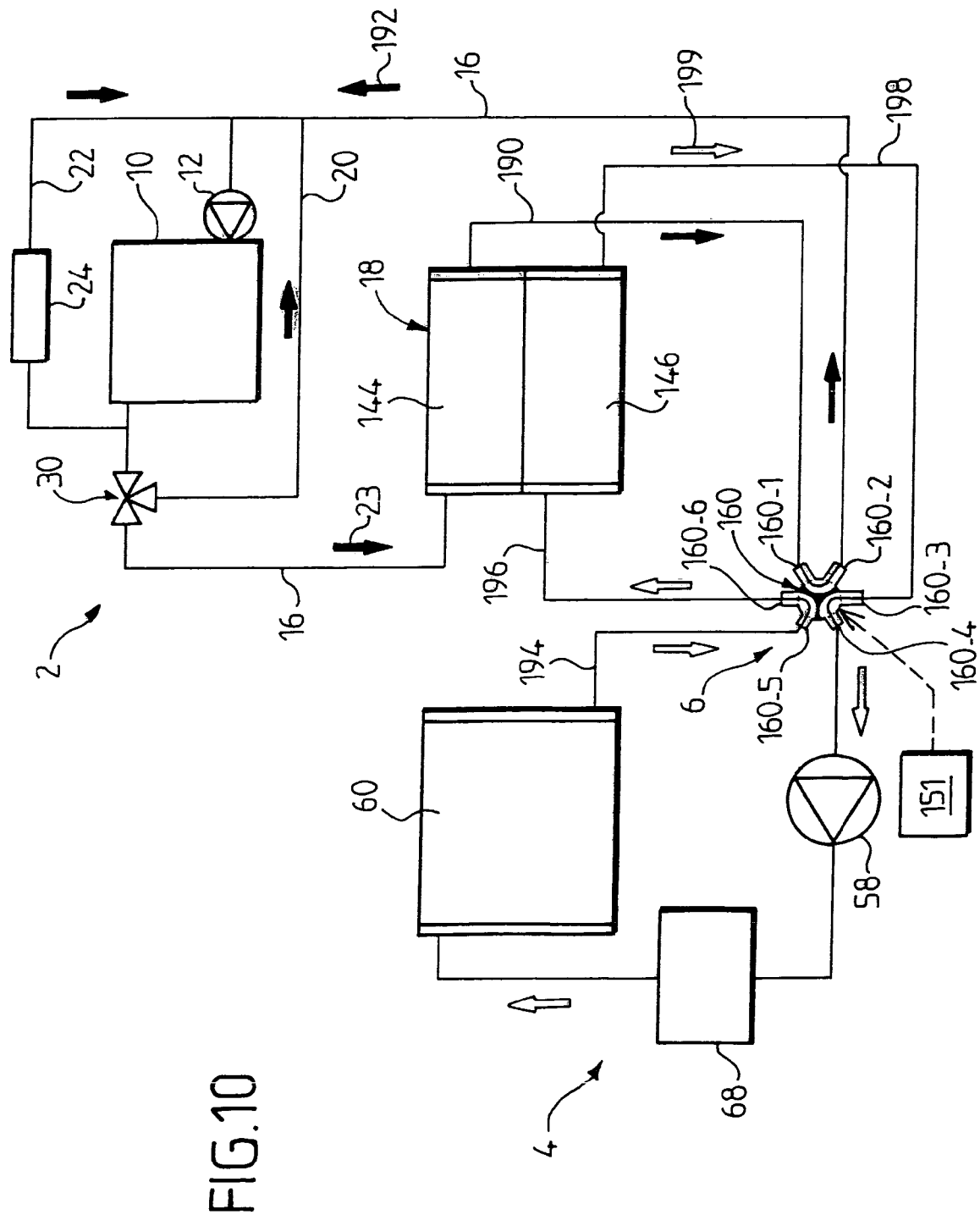
FIGS. 10 and 11 are block diagrams of another embodiment of a system for managing heat energy according to the invention in which the distribution means are constituted by a single valve.
Figure 11:
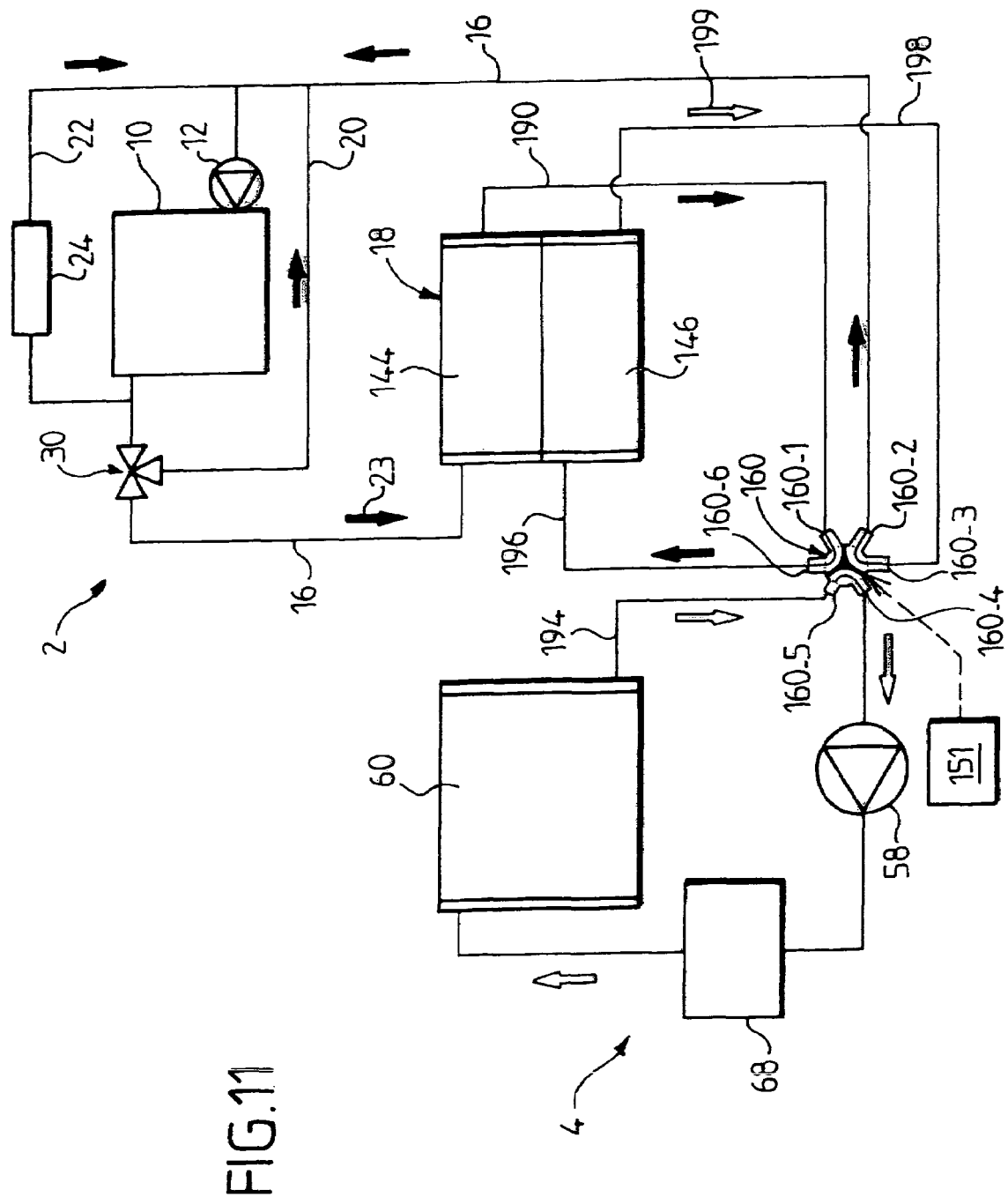
Figure 12:
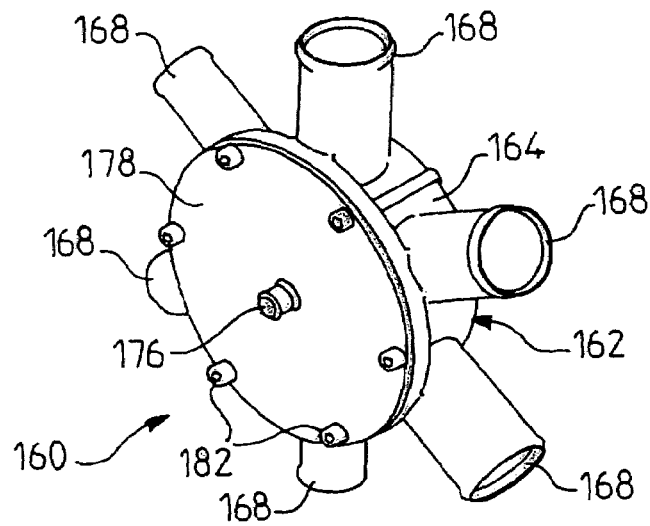
FIGS. 12 to 14 are an external view and two cross-sectional views respectively of the single valve of the system shown in FIGS. 10 and 11.
Figure 13:
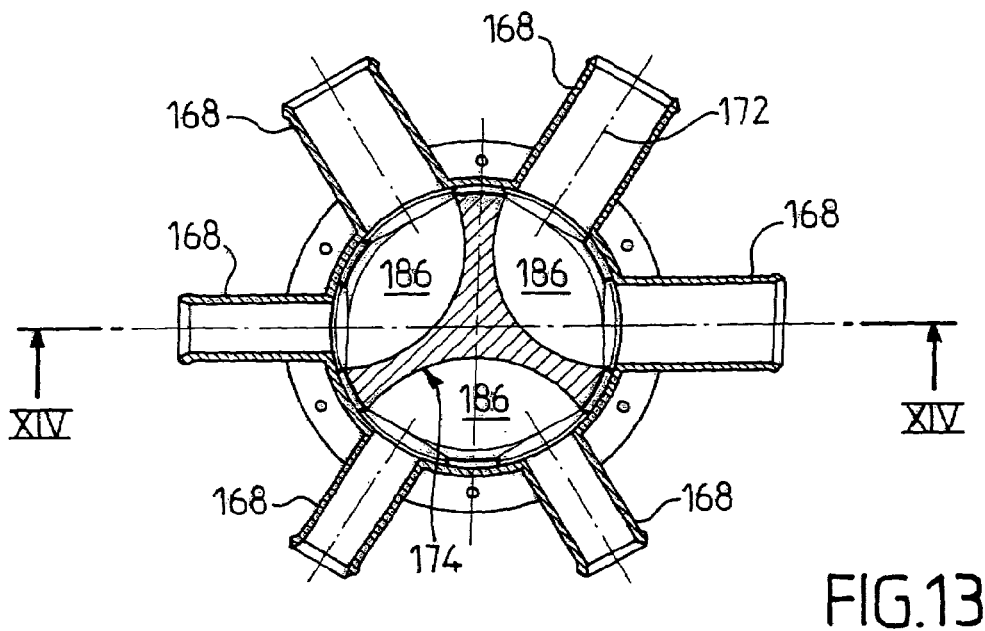
Figure 14:
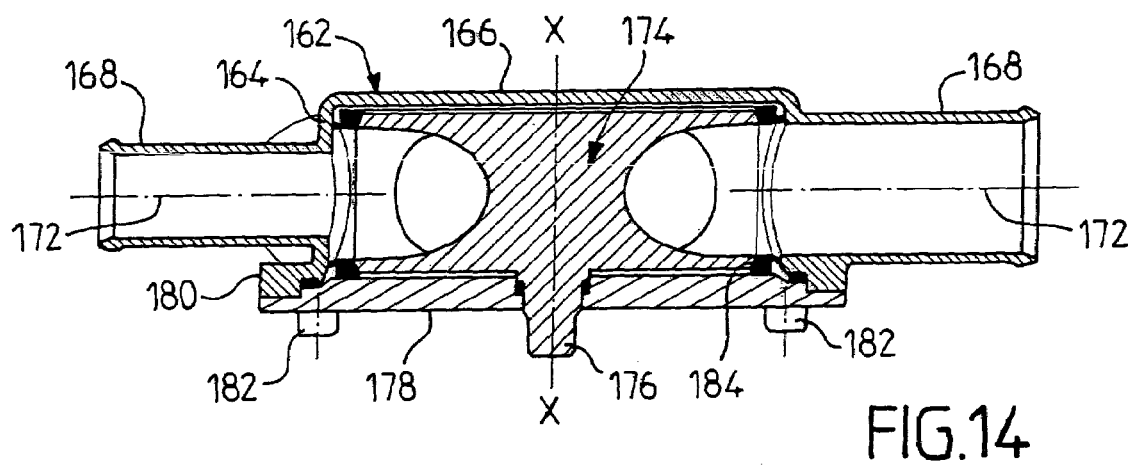

FIGS. 10 and 11 show another embodiment of a system for managing the heat energy of an engine 10 of a motor vehicle. As in the example described with reference to FIGS. 8 and 9, it is constituted by a main system 2 and a secondary loop 4 connected by interconnecting means indicated by the general reference 6. The constitution of the main system and of the secondary loop is identical and the same references have been used to indicate the same elements. Consequently, they will not be described in detail. The example described in FIGS. 10 and 11 is distinguished by the fact that the interconnecting means are constituted by a unique valve 160 whose constitution has been shown in detail in FIGS. 12, 13 an 14. FIG. 12 is an external perspective view of the valve 160. The valve comprises a body indicated by the general reference 162 constituted by a cylindrical side wall 164 and a base wall 166 (FIG. 14). The body 162 is a general shape of revolution about an axis XX. It comprises six pipes 168 which emerge axially in a cylindrical housing 170 of axis XX. In the embodiment shown, the axes 172 of the pipes 168 are coplanar. Furthermore, these pipes are spaced by 60° from each other around the periphery of the cylindrical side wall 164. All of these pipes emerge in the cylindrical wall 164. None of them is situated on the base wall 166.

Inside the cylindrical housing 170, there is housed a rotary adjustment device 174 whose diameter corresponds substantially with the internal diameter of the cylindrical housing 170. The adjustment device 174 is extended by a rod 176 aligned with the axis XX. This rod traverses a central opening in the cover 178 of circular shape which is screwed on a flange 180 of the body 162 of the valve by the intermediary of fixing screws 182 with the interposition of a fluid-tight ring seal 184 (FIG. 14). The rotary device 14 can be driven in rotation about the axis XX by drive means (not shown) which can be constituted, for example, by a stepper motor capable of setting the rotary device 174 in a multiplicity of different positions, either by successive increments, or in a continuous manner.

The rotary device 174 comprises pockets 186, three of them in the example shown, capable of connecting the pipes 168 with one another. By a rotation of the rotary device through an angle of 60° in one direction or the other, it is possible to connect two different adjacent pipes.

In FIG. 10, the system for managing the heat energy of the engine 10 has been shown in the start and moderate load configuration. In this configuration only, the high temperature exchange section 144 forms part of the main system 2. The cooling fluid passes through the radiator pipeline 16 (arrow 23) through the high temperature heat exchanger 144 from which it leaves through the pipeline 190 connected to the way 160-1 of the six-way valve 160. It leaves it through the way 160-2 connected to the other branch of the cooling radiator pipeline 16. The coolant fluid then returns to the engine 10, as indicated by the arrow 192.

In this configuration, the assignable heat exchange section 146 is included in the secondary loop 4. The cooling fluid put into circulation by the secondary electric pump 58 traverses the heat exchanger 68 and then the low temperature cooling radiator 60. It leaves it through the pipeline 194 connected to the inlet way 160-5 of the six-way valve 160. It leaves the valve through the outlet way 160-6 connected to the pipeline 196 which enters the high temperature heat exchange section 146. After having traversed the high temperature section 146, the cooling fluid leaves through the pipeline 198 (arrow 199) and then enters the valve 160 though the inlet way 160-3 and leaves it through the outlet way 160-4 connected to the circulation pump 58. It is thus observed that the low temperature exchanger 60 and the heat exchange section 146 are connected in series and that the cooling fluid passes though them successively.

FIG. 11 shows the configuration of the system of FIG. 10 above the critical value $T_c$, for example 105° C., of the cooling fluid of the engine 10. In this configuration, the cooling fluid enters the high temperature heat exchange section 144 through the cooling pipeline 16 (arrow 23). It leaves it through the pipeline 190, as before, connected to the way 160-1 of the six-way valve 160. However, in this configuration, the rotary adjustment device 174 has pivoted though 600 with respect to the angular position that it occupied in the previous configuration, such that the way 160-1 is now connected to the way 160-6 and to the pipeline 196 connected to the input of the high temperature exchange section 146. The fluid leaves the section 146 through the pipeline 198 connected, as before, to the way 160-3 of the valve 160. However, in this configuration, the output of the cooling fluid takes place through the way 160-2 connected to the pipeline 16 through which the cooling fluid returns to the pump 12 and the engine 10. It is thus observed that in this configuration the high temperature heat exchange section 144 and the assignable section 146 are successively passed through by the cooling fluid and are both included in the main system 2.

As cooling capability, the secondary loop 2 has only that of the low temperature exchanger 60. On leaving this exchanger, the fluid circulates though the pipeline 194 as far as the way 160-5 of the valve connected to the outlet way 160-4 directly connected to the electric pump 58. Thus, in this example embodiment also, the coolant fluid circulates in circuits that are isolated from one another.

Figure 15:
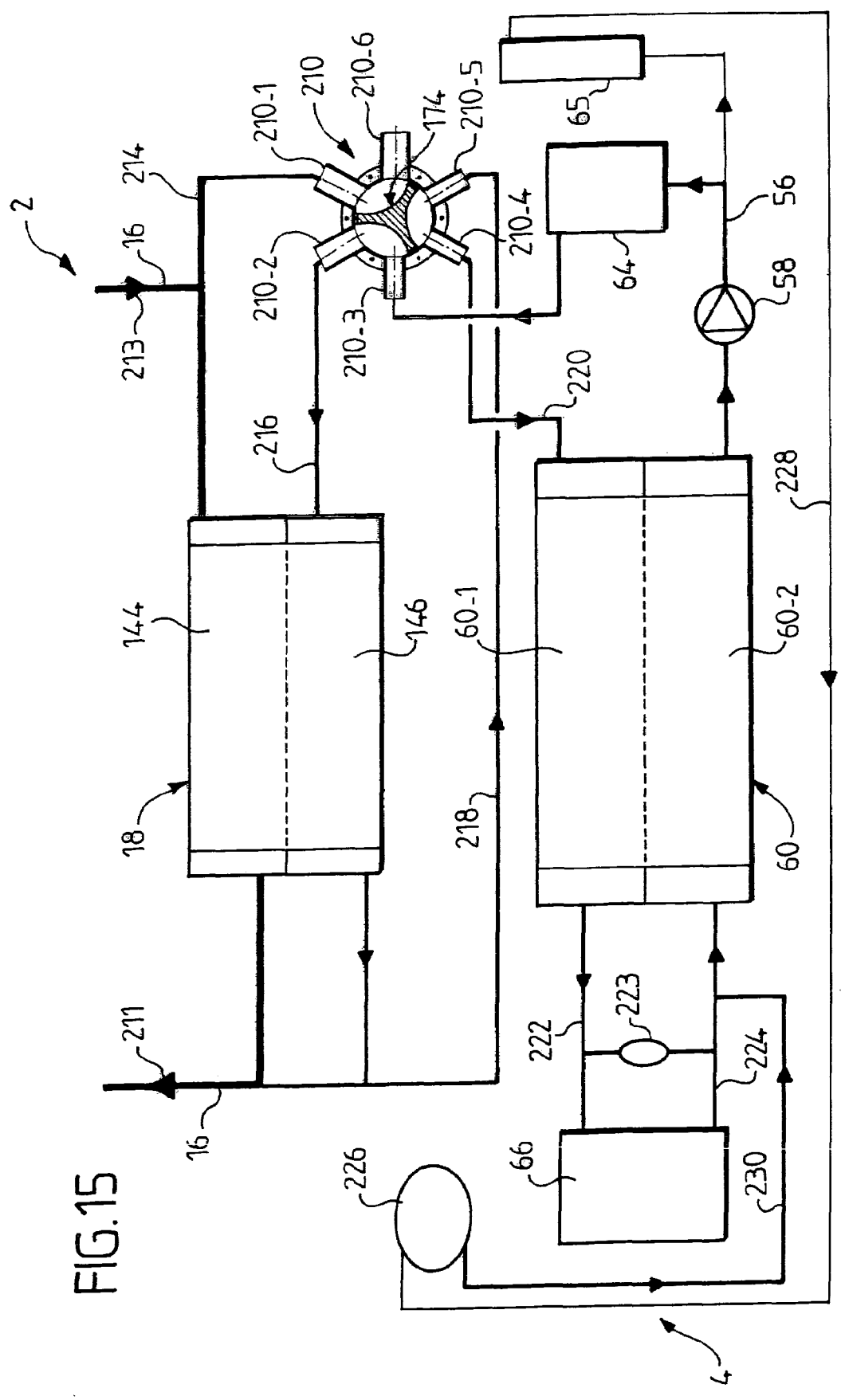
FIG. 15 is a block diagram of a system for managing the heat energy of an engine of a motor vehicle comprising a five-way valve in a start or light load or medium load configuration.
Figure 16:
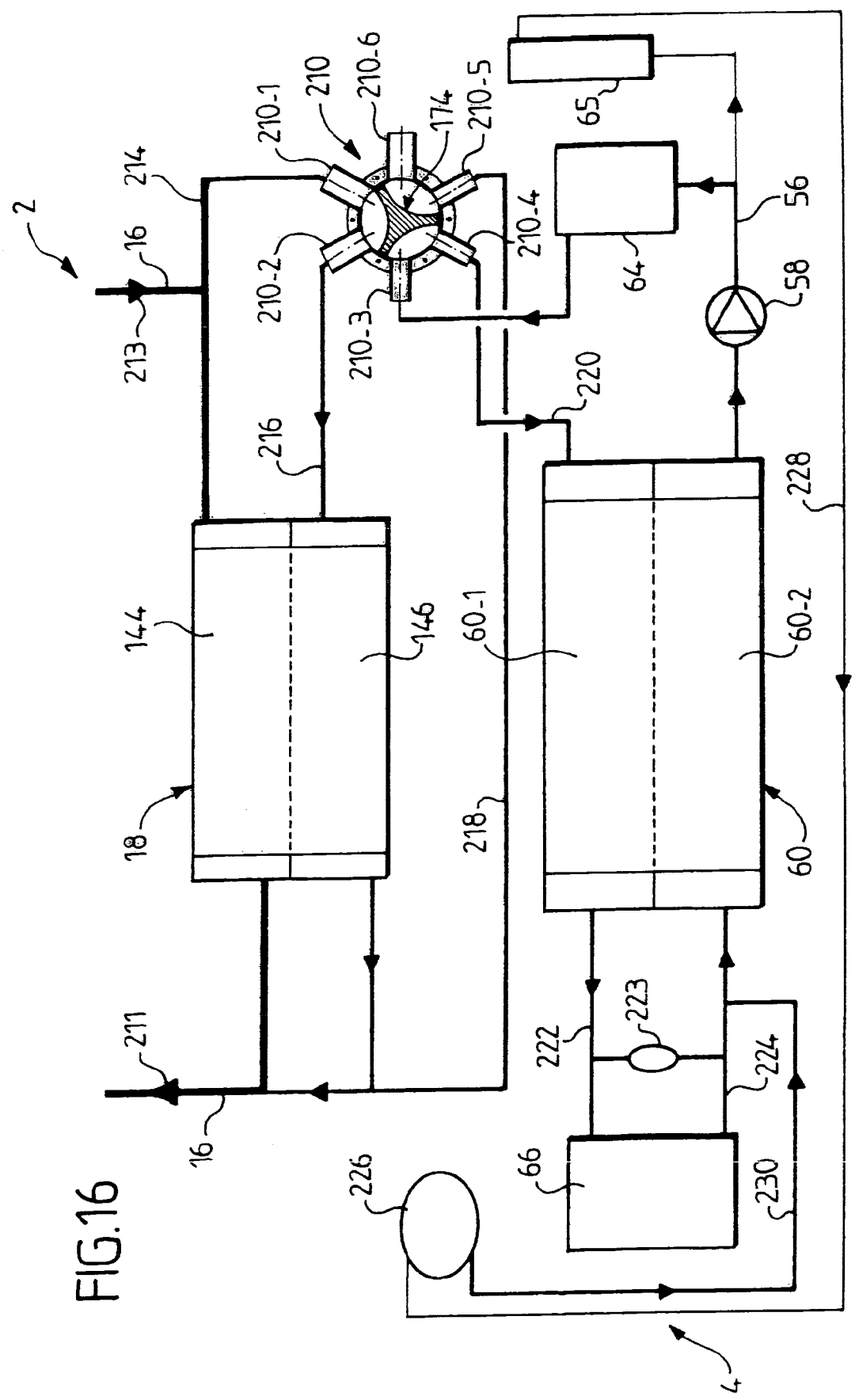
FIG. 16 is a block diagram similar to that of FIG. 15 in a heavy or very heavy load configuration.
Figure 17:
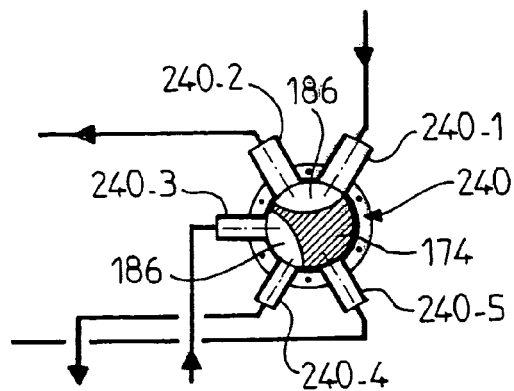
FIG. 17 is a variant embodiment of the valve forming part of the system shown in FIGS. 15 and 16.

FIGS. 15 to 17 show a variant embodiment of the system for managing the heat energy of an engine shown in FIGS. 10 to 14. In this latter embodiment, the coolant fluid for cooling the engine, after having passed through the high temperature heat exchange section 144, necessarily passes through the valve 160, and this occurs whatever the configuration (moderate or heavy load on the system) through the pipeline 190 (see FIGS. 10 and 11). On the contrary, in the embodiment of FIGS. 15 to 17, the cooling fluid of the engine, after having traversed the high temperature heat exchange section, returns directly to the engine through the cooling radiator pipeline 16 (see arrow 211).

In FIGS. 15 and 16, only the lower part of the system has been shown, the upper part being identical to that which has been described previously with reference to FIGS. 10 and 11.

In the cold start and moderate load configuration shown in FIG. 15, in which only the high temperature heat exchange section 144 is included in the main system 2, the fluid coming from the outlet of the engine through the pipeline 16 (arrow 213) enters the exchange section 144 and then, after having traversed this section, returns directly to the engine through the other branch of the cooling pipeline 16. It will be noted that the inlet pipeline 16 is connected to the six-way valve 210 by the pipeline 214. However, in this configuration, the way 210-6 of the valve 210 is closed, such that the pipeline 214 constitutes a dead-end through which the cooling fluid cannot circulate.

With regard to the secondary loop 4, the cooling fluid put into circulation by the electric water pump 58 is distributed between the condenser 64 of the air conditioning circuit of the passenger compartment of the motor vehicle and the fuel cooling radiator 65. The part of the cooling fluid which has traversed the condenser 64 enters the valve 210 through its way 210-3 which is connected, in the position of the rotary adjustment device 174 corresponding to this configuration and shown in FIG. 15, to the way 210-2 of the valve. The cooling fluid enters the assignable heat exchange section 146 through the pipeline 216 and then returns through the pipeline 218 to the way 210-5 of the valve 210. The fluid leaves through the way 210-4 through the pipeline 220 and enters the low temperature radiator 60. In the example shown, the radiator 60 is divided into two passages 60-1 and 60-2. The coolant fluid firstly travels through the passage 60-1 from right to left according to the figure, and enters the supercharging air radiator 66 though the pipeline 222. After having traversed the supercharging air radiator, the cooling fluid traverses the second passage 60-2 of the low temperature radiator 60 and the cycle resumes.

The fraction of the cooling fluid of the secondary low temperature loop 4 that has traversed the fuel cooling exchanger 65 traverses a low temperature expansion vessel 226 by the intermediary of the pipeline 228 before returning to the passage 60-2 of the exchanger 60 through the pipeline 230.

In the heavy or very heavy load configuration shown in FIG. 16, the cooling fluid coming from the engine through the pipeline 16 (arrow 213) circulates in parallel in the high temperature heat exchange section 144 and in the assignable section 146. It traverses directly through the section 144 through the pipeline 16 and through the section 146 by passing through the six-way valve 210. It enters through the way 210-1 and leaves through the way 210-2 and the pipeline 216 before returning to the engine through the return pipeline of the cooling branch (arrow 211).

In this heavy or very heavy load configuration, the cooling fluid of the secondary loop 4, after having traversed the condenser 64, enters the valve 210 through the way 210-3 and leaves it through the way 210-4 in order to rejoin, through the pipeline 220, the passage 60-1 of the low temperature exchanger 60. Then the coolant fluid traverses the supercharging air radiator 66 into which it enters through the pipeline 222 and from which it leaves through the pipeline 224 in order to traverse, from left to right according to the figure, the passage 60-2 of the radiator 60. The cycle repeats, the circulation of the fraction of the cooling fluid which traverses the fuel cooling radiator 65 and the low temperature expansion chamber 226 is not changed.

An adjustable diversion pipeline 223, interposed between the pipelines 222 and 224, makes it possible to adjust the quantity of cooling fluid that traverses the supercharging air radiator 66. However, the adjustable diversion pipeline 223 could be dispensed with in a variant embodiment.

Considering the fact that the way 210-6 of the valve 210 is permanently closed in the example embodiment described with reference to FIGS. 15 and 16, it could, purely and simply, be eliminated. It is thus possible to conceive a valve having only five ways, as shown in FIG. 17. These ways have been referenced 240-1 to 240-5 and the way 210-6 has been eliminated. Consequently, the shape of the rotary device for adjusting the circulation of the cooling fluid 174 has been modified. This device comprises only two pockets 186 instead of three as in the previously described example. However, this modification is not essential and the rotary device could also comprise three pockets 186, for example in order to achieve manufacturing standardization.

Figure 18:
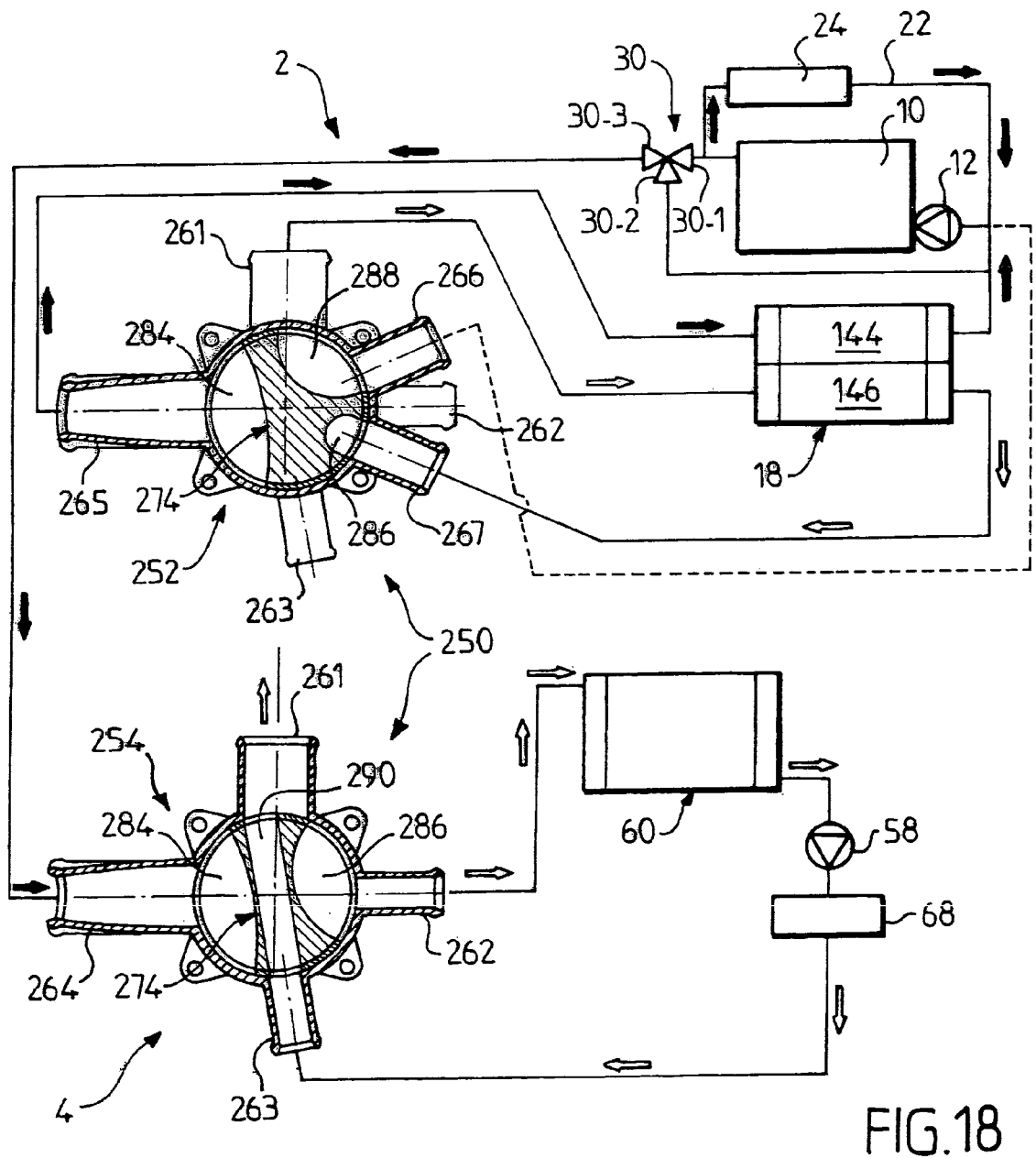
FIGS. 18 and 19 are block diagrams of yet another embodiment of a system for managing the heat energy of an engine of a motor vehicle in which the interconnecting means are constituted by a single valve comprising two states.
Figure 19:
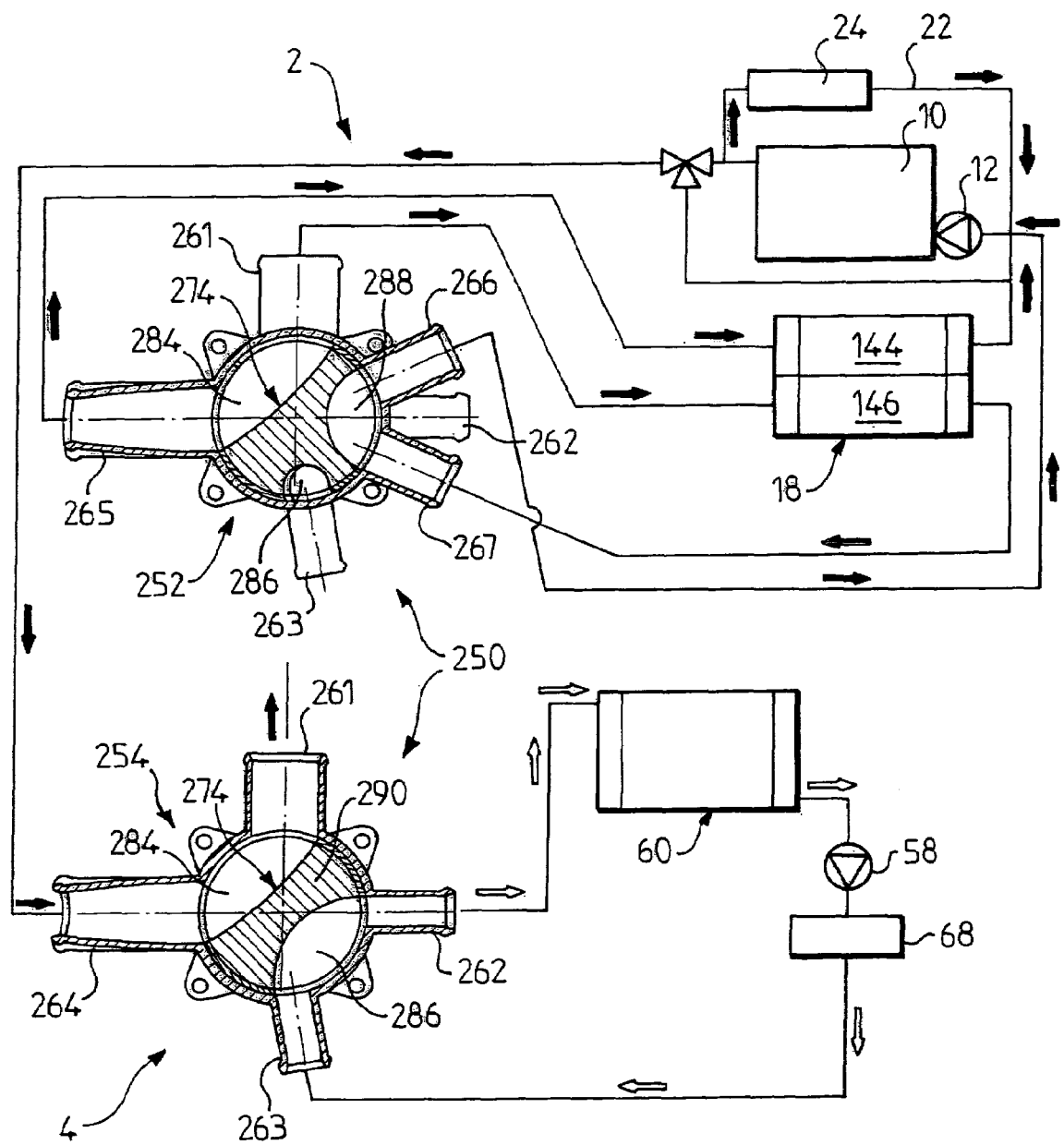

FIGS. 18 and 19 show yet another variant embodiment of a system for managing the heat energy of motor vehicle engine according to the present invention. This system is similar to the one that has been described with reference to and shown in FIGS. 10 and 11. It differs from it essentially in that the valve which produces the interconnection between the main system 2 and the secondary loop 4 comprises several levels, two in the example shown, instead of a single one in the embodiment of FIGS. 10 and 11. The pipes of this valve, indicated in an overall manner by the reference 250, are distributed over two levels, namely a lower level indicated by the reference 254 and an upper level indicated by the reference 252 (see FIGS. 18 and 19). In order to achieve clarity in the drawing, the levels 252 and 254 have been shown separated from each other. It must however be understood that this is a diagrammatic representation. In reality, these two levels are disposed one above the other, as will be explained in greater detail in the continuation of the present description.

Figure 20:
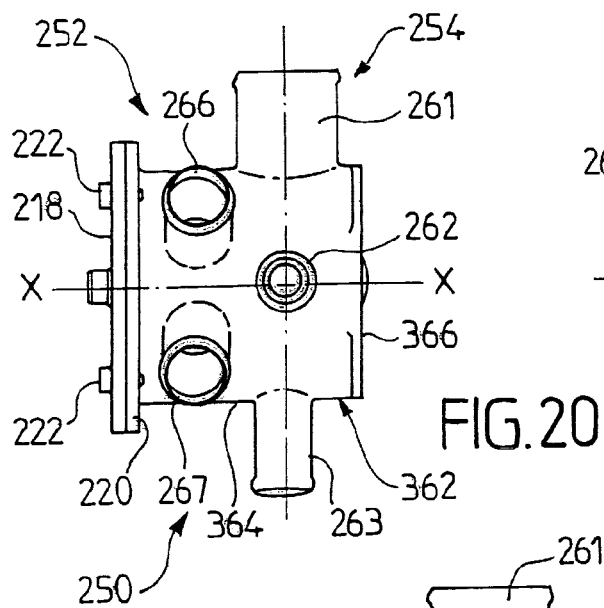
FIG. 20 is an external view of the valve comprising pipes distributed over two stages or levels.
Figure 21:
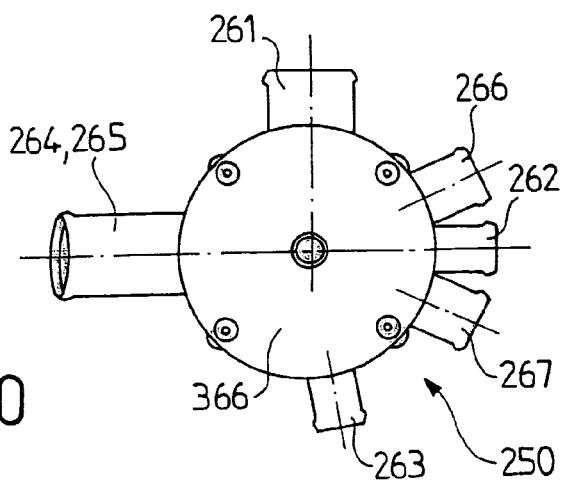
FIG. 21 is a view from the left of the valve shown in FIG. 20.
Figure 22:
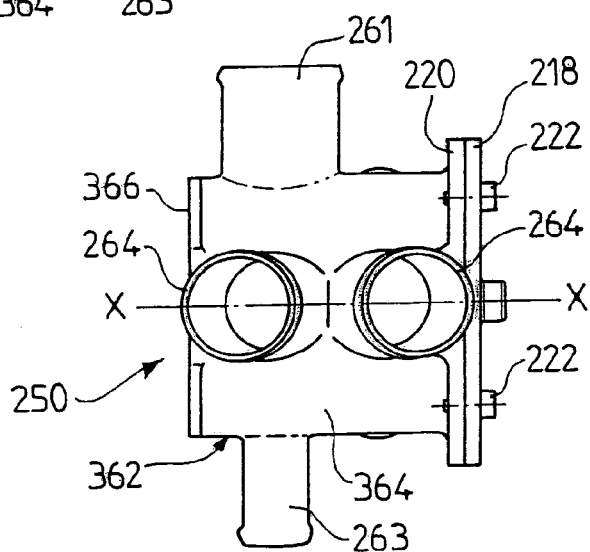
FIG. 22 is a rear view of the valve shown in FIG. 20.
Figure 23:
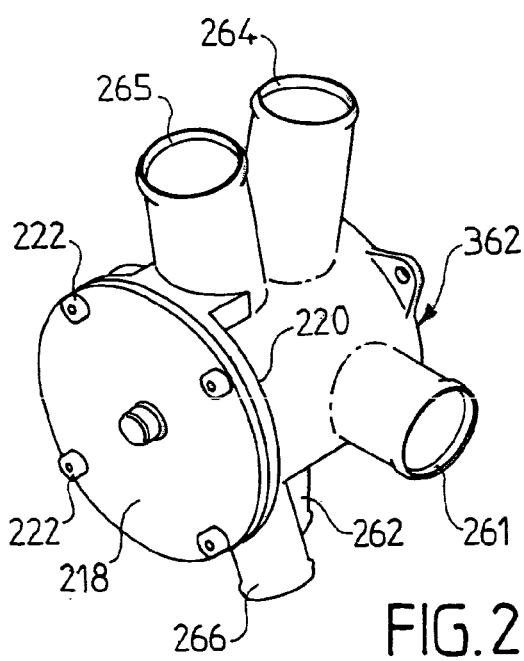
FIGS. 23 and 24 are two perspective views of the valve shown in FIGS. 20 and 21.
Figure 24:
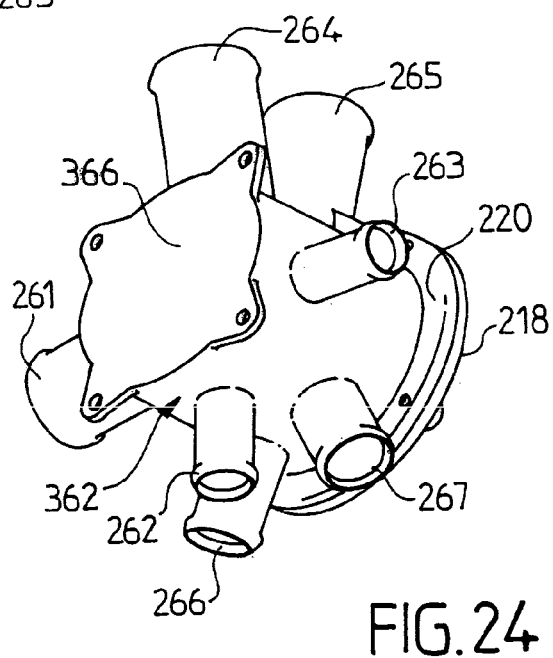

FIGS. 20 to 25 show different external views of the control valve 250. FIG. 20 is an external view of the valve in a plane perpendicular to its longitudinal axis XX, FIG. 21 is a view from the left of the valve shown in FIG. 20 and FIG. 22 is a rear view of the valve shown in FIG. 20. FIGS. 23 and 24 are two perspective views showing the valve 250 from two opposite angles. FIG. 23 shows the front part of the valve, that is to say the cover of the latter, whilst FIG. 24 shows the rear view of the valve, that is to say the view of the base of its body 2.

The valve comprises a cylindrical body 362 limited by a base wall 366 and a cylindrical side wall 364 of axis XX. The cylindrical side wall 364 delimits a cylindrical housing 370 closed by a cover 218 which is fixed by screws 222 (four of them in the example shown) onto a flange or collar 220 forming part of the body 362. A fluid-tight seal, for example a ring seal 324, is interposed between the cover and the flange.

As can be seen in the various figures, the body 362 comprises inlet and/or outlet pipes. These pipes have been indicated by the references 261 to 267. All of these pipes are connected to the cylindrical side wall 364 of the body. Four pipes, namely the pipes 261 to 264, belong to the bottom level 254 of the valve 250. In other words, they are disposed close to the base 366. The pipes 265, 266 and 267 belong to the upper level 252. In other words they are closer to the collar 220 and the cover 218.

Figure 25:
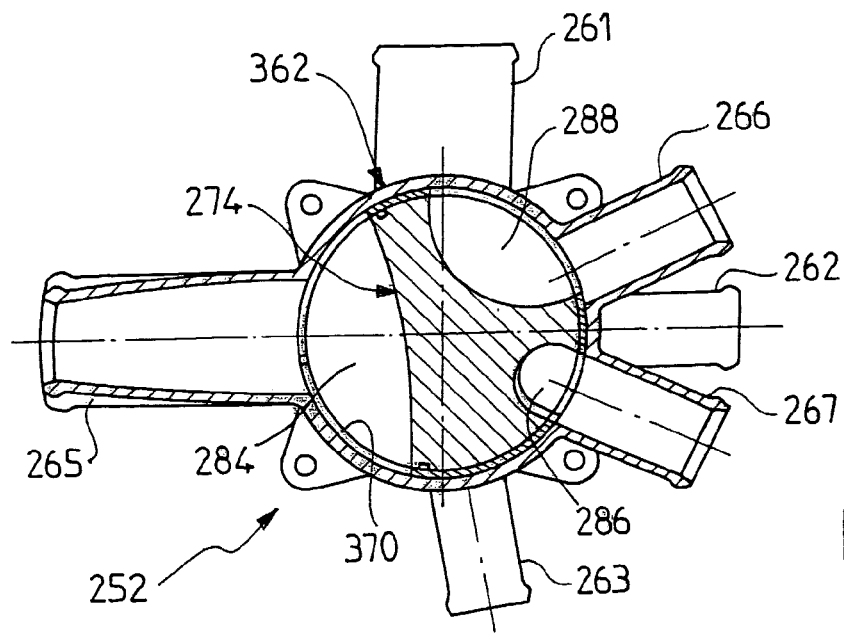
FIGS. 25 and 26 are two cross-sectional views trough planes perpendicular to the axis XX of the valve in the light load configuration corresponding to FIG. 18
Figure 26:
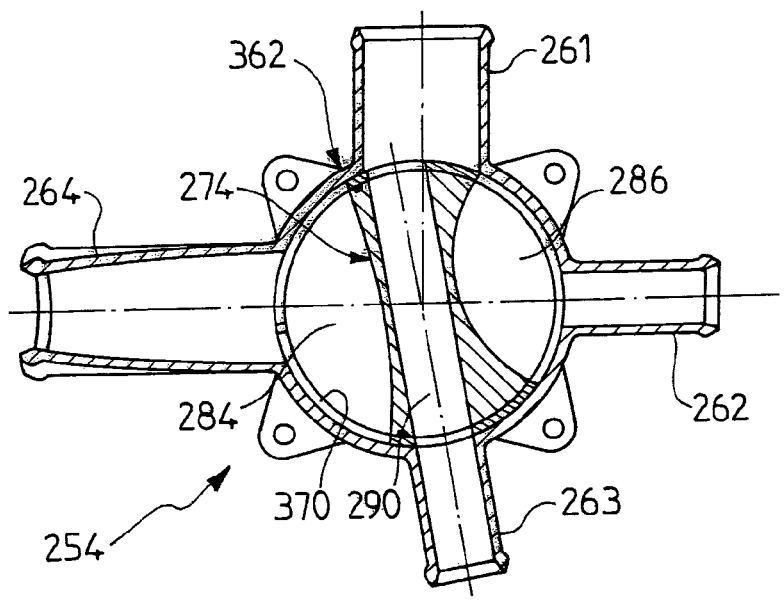
Figure 29:
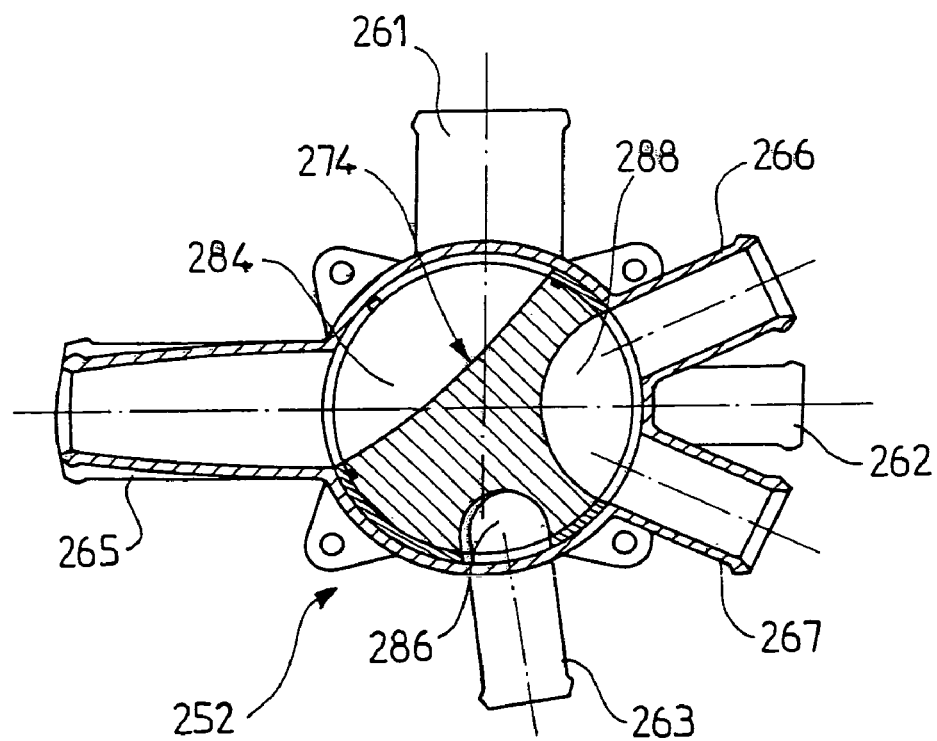
FIGS. 29 and 30 are two cross-sectional views similar to FIGS. 25 and 26 shown in the heavy load configuration.
Figure 30:
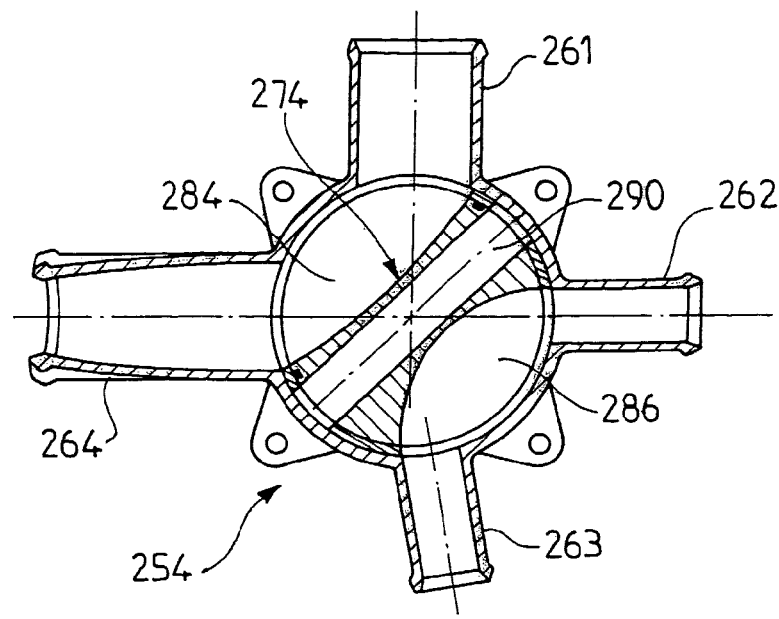

FIGS. 25 and 26, on the one hand, and FIGS. 29 and 30, on the other hand, are cross-sectional views of the valve 250 through planes perpendicular to the longitudinal axis XX of the latter. FIGS. 25 and 29 correspond to cross-sectional planes through the upper level of the valve, whilst the cross-sections of FIGS. 26 and 30 pass through the lower plane 254 of the valve.

Figure 27:
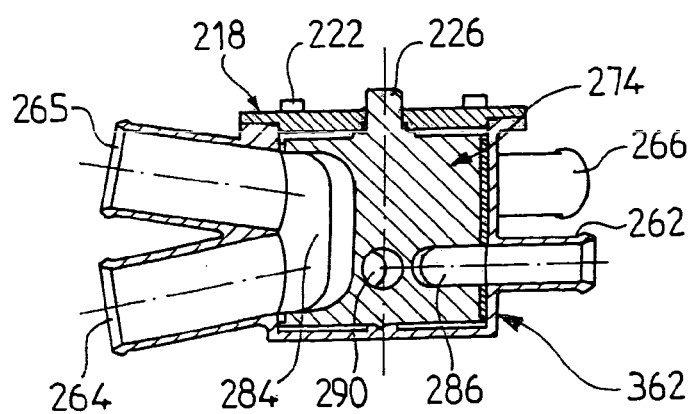
FIGS. 27 and 28 are two cross-sectional views of the two-level valve through the plane of the axis XX in the partial load configuration.
Figure 28:
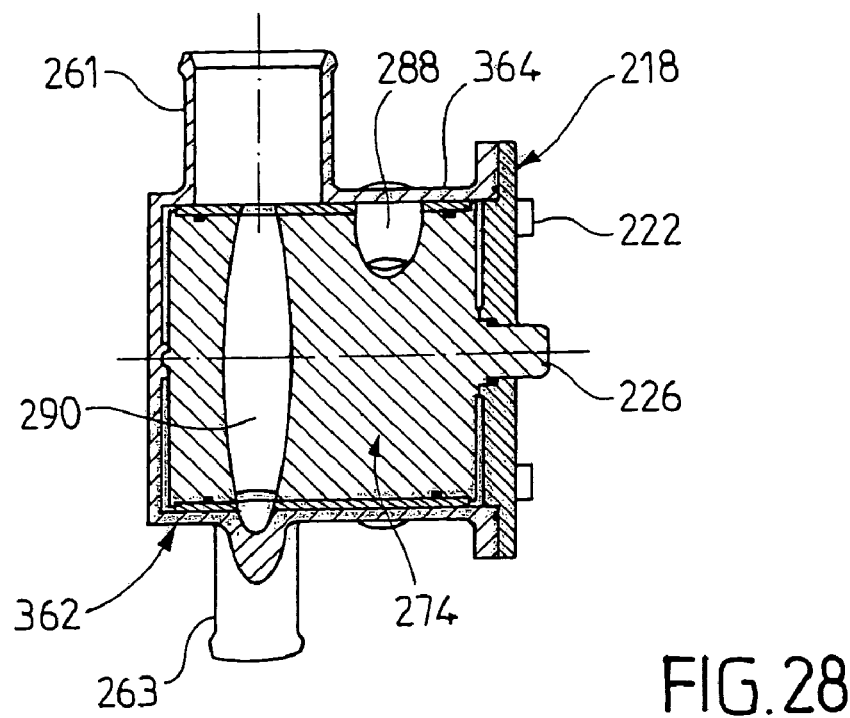
Figure 31:
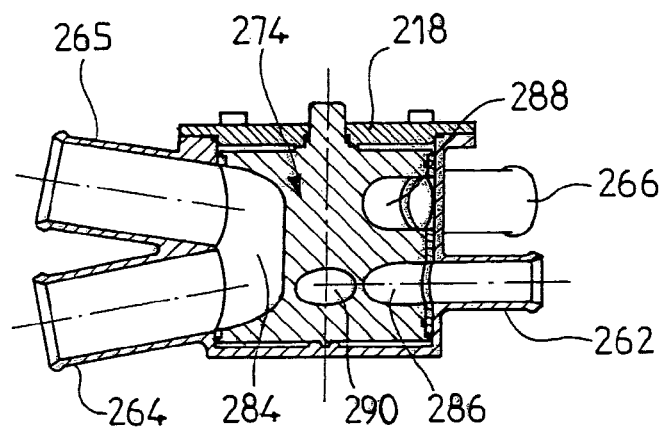
FIGS. 31 and 32 are cross-sectional views of the valve similar to FIGS. 27 and 28, but shown in the heavy load configuration.
Figure 32:
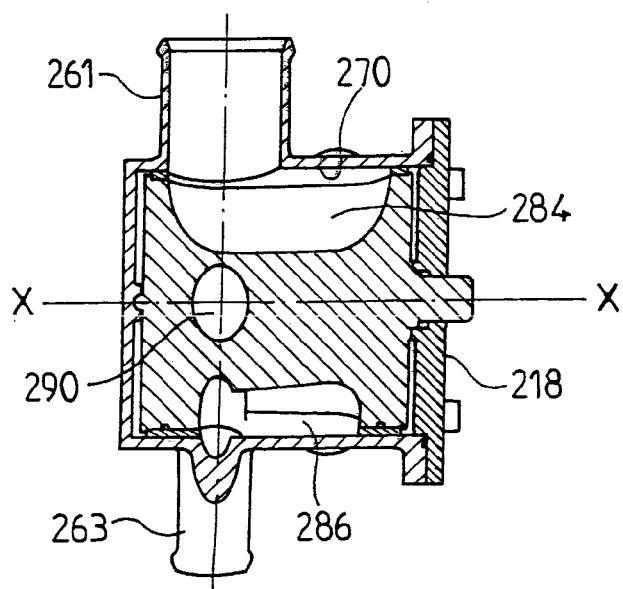
Figure 33:
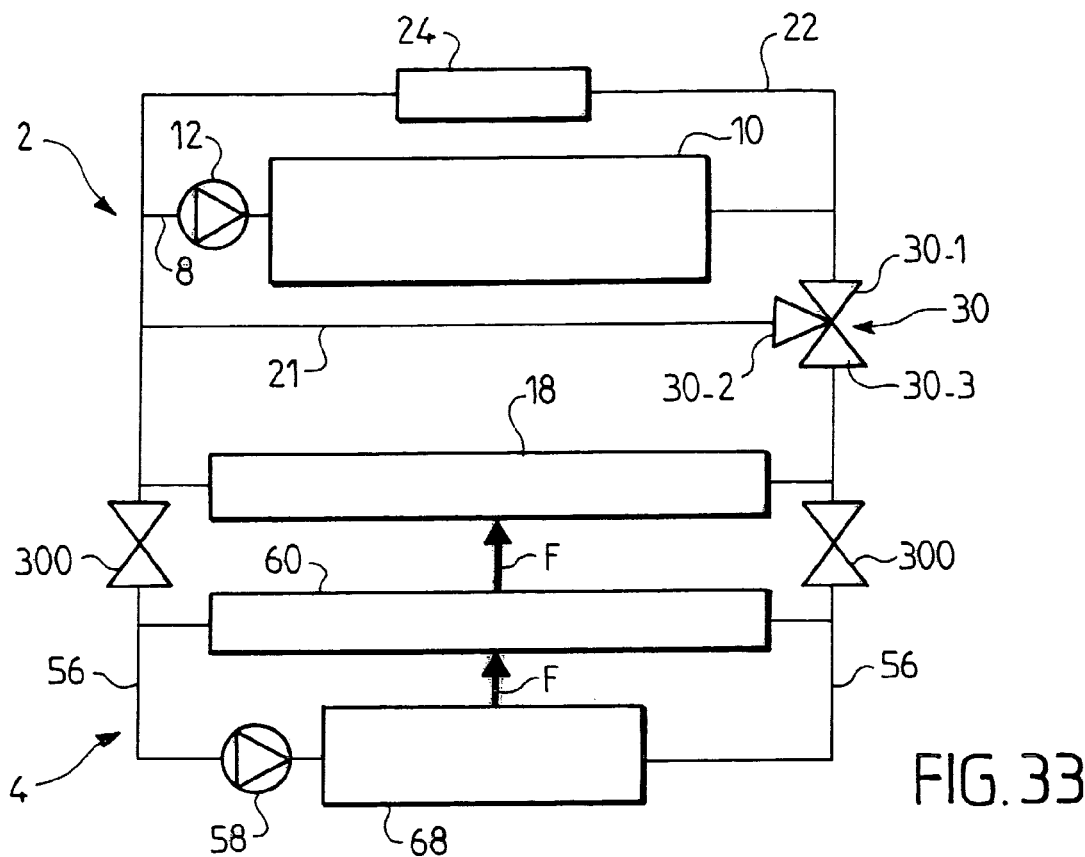
FIG. 33 is a block diagram of a system for managing the heat energy of an engine comprising a low temperature radiator and a high temperature radiator connected in parallel.

FIGS. 25 and 26 shown the valve in the light load configuration which corresponds to the illustration in FIG. 18, whilst FIGS. 29 and 30 show it in the heavy load configuration which corresponds to FIG. 19. FIGS. 27 and 28, on the one hand, and FIGS. 31 and 32, on the other hand, are cross-sectional views of the valve 250 through planes including the longitudinal axis XX. FIGS. 27 and 28 correspond to a partial or light load configuration, whilst FIGS. 31 and 32 correspond to a heavy load configuration.

A rotary device, indicated in an overall manner by the general reference 274, is disposed such that it rotates inside the cylindrical housing 370 of the body 362. It is fitted such that it rotates about the longitudinal axis XX of the valve 250. It comprises a solid body of generally cylindrical shape of axis XX which is extended by a rod 226 directed along the axis XX and which traverses a central opening of the cover 218 (FIG. 28). The rotary device can be driven in rotation about the axis XX by drive means, that are not shown, capable of placing it in angular positions corresponding to the different configurations of the heat energy management system of the invention.

Three pockets have been formed inside the cylindrical body 274. These pockets have been indicated by the references 284, 286 and 288. The pocket 284 extends over the lower level and the upper level and it is capable of connecting the pipes 264 and 265 with each other. It is also capable of connecting with the pipe 261.

The pocket 286 also extends over both the lower level 254 and the upper level 252. It is substantially L-shaped. It is able to connect the pipes 261 and 266, and also the pipes 262 and 263.

The third pocket 288 is located uniquely in the upper level 252 of the body of the rotary device 274. It is capable of connecting the pipes 266 and 267. Finally, the rotary adjustment device comprises a traversing channel 290 which, in the example shown, traverses it diametrically. This channel is intended to cause a part of one of the circuits to switch into the other. It is located in the lower level 254 of the rotary device 274 (FIG. 26).

FIG. 18 corresponds to the configuration of the heat energy management system for a light load configuration, for example a configuration in which a parameter such as the temperature of the cooling fluid of the heat engine 10 is below a critical value $T_c$, for example 105° C. In this configuration the high temperature cooling radiator is constituted uniquely by the high temperature heat exchange section 144 forming part of the second row of heat exchange tubes of the previously described heat exchange module. Consequently, the assignable heat exchange section, which completes the second row of tubes of the heat exchange module, forms part of the low temperature cooling circuit. The three-way thermostatic valve 30 is oriented in such a way that the cooling fluid is directed towards the pipe 264 belonging to the lower level 254 of the control valve 250. The cooling fluid passes from the lower level 254 to the upper level 252 through the pocket 284 which, as has been described previously, makes it possible to connect these two levels with each other. The fluid leaves through the pipe 265, which therefore constitutes an outlet pipe, in order to then be directed towards the high temperature heat exchange section 144. After having been cooled, the fluid returns to the engine 10 in a conventional manner, and the circulation of the cooling fluid is repeated.

With regard to the low temperature cooling circuit, the cooling fluid, moved by the low temperature pump 58, traverses the heat exchanger 68 and enters through the pipe 263, which therefore constitutes an inlet pipe, into the lower level 254 of the control valve 250 of the invention. The fluid traverses the rotary device 274 by means of the traversing channel 290 and emerges into the pipe 261 forming an outlet pipe.

The fluid then enters the assignable heat exchange section 146 and then, after having traversed this heat exchange section, enters the upper level 252 of the control valve through the pipe 267. In this configuration of the cooling circuit, the rotary device 274 is angularly oriented in such a way that the pocket 286 is facing the inlet pipe 267. As previously explained, the pocket 286 makes it possible to cause the fluid to pass from one level to the other, in this case from the upper level 252 to the lower level 254. The fluid therefore leaves through the pipe 262, which therefore constitutes an outlet pipe, in order to enter the low temperature heat exchanger 60. The fluid then repeats the same circuit.

FIG. 19 shows the heat energy management system of the invention in a heavy or very heavy load configuration in which the temperature of the cooling fluid is higher than a critical value $T_c$, for example 105° C. In this configuration, it is necessary to cool the heat engine 10 more intensely. For this purpose, it is necessary to transfer the assignable cooling capability 146 of the cooling circuit of the low temperature cooling loop 4 to the main system 2.

The three-way thermostatic valve is oriented in such a way that the fluid circulates towards the inlet pipe 264 forming part of the lower level 254 of the valve 250. In this configuration, the orientation of the device 274 is different. The pocket 284 is facing the pipes 264 and 265 but also connects the inlet pipe 264 with the pipe 261. There is therefore an inlet pipe, namely the pipe 264, and two outlet pipes, namely the pipes 261 and 265. In this example, the pipes are not connected exclusively in pairs, but one pipe is simultaneously connected with two different pipes. The cooling fluid leaves the upper level 252 through the outlet pipe 265 in order to traverse the high temperature heat exchange section 144 but, furthermore, a portion of the cooling fluid leaves through the outlet pipe 261 in order to traverse the assignable heat exchange section 146 which is thus put in parallel with the high temperature heat exchange section 144. Thus, the cooling capabilities 144 and 146 placed in parallel with each other are added, which makes it possible to cool the heat engine 10 of the motor vehicle more intensely.

With regard to the low temperature cooling circuit (secondary loop 4), the cooling fluid is put into circulation by the low temperature electric pump 58 and traverses the heat exchanger 68, then enters through the inlet pipe 263 into the lower level 254 of the control valve 250, in the angular orientation of the rotary device 274 shown in FIGS. 29, 30, 31 and 32. The pocket 286 connects the pipe 263 with the pipe 262, such that the fluid enters the low temperature heat exchange section. After having traversed the assignable heat exchange section 146, the fluid enters the valve 250 through the inlet pipe 266 located in the upper level of the valve, then into the pocket 288, and leaves through the pipe 267 constituting an outlet pipe before returning, in a conventional manner, to the high temperature circulation pump in order to again pass through the heat engine of the vehicle. The same circulation of the fluid is then repeated.

FIGS. 33 to 37 show yet another embodiment of a system for managing the heat energy of a motor vehicle's engine. This system comprises, like the previous ones, a main system 2 and a secondary loop 4 connected by interconnecting means constituted, in this example, by two valves 300. In this example, the main radiator 18, or high temperature radiator, is in one piece. It is not divided into a high temperature section and an assignable section, as described in certain preceding embodiments. The secondary radiator or low temperature radiator 60 is also in one piece. The radiators 18 and 60 can be made in the form of separate radiators. They can be, as in the example shown, disposed one behind the other and traversed by the same air flow, as represented by the arrows F. This arrangement has the advantage of reducing the space requirement of the assembly. In this case, the low temperature radiator 60 is disposed in front of the radiator 18, with respect to the direction of circulation of the air flow F, in order to be better cooled.

The exchangers 18 and 60 can also be constituted in the form of a heat exchange module comprising common cooling fins. One row of tubes of the module therefore constitutes the high temperature radiator, whilst the other row of tubes constitutes the low temperature radiator. However, in other embodiments, the low temperature radiator (and/or the high temperature radiator) can be constituted by a row of tubes and a fraction of the other row of tubes, in such a way as to increase its cooling capability. The radiators 18 and 60 or the corresponding rows of tubes of a heat exchange module are connected in parallel to the connectors of the two-way valves 300.

Figure 34:
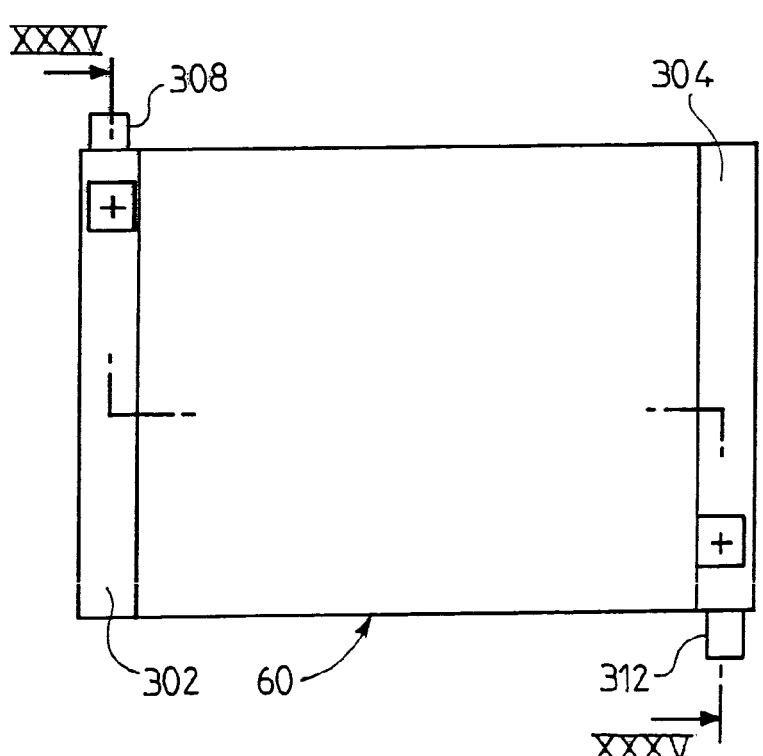
FIGS. 34 and 35 are an elevation and a cross-sectional view respectively of a heat exchange module forming part of the temperature management system shown on FIG. 33.
Figure 35:
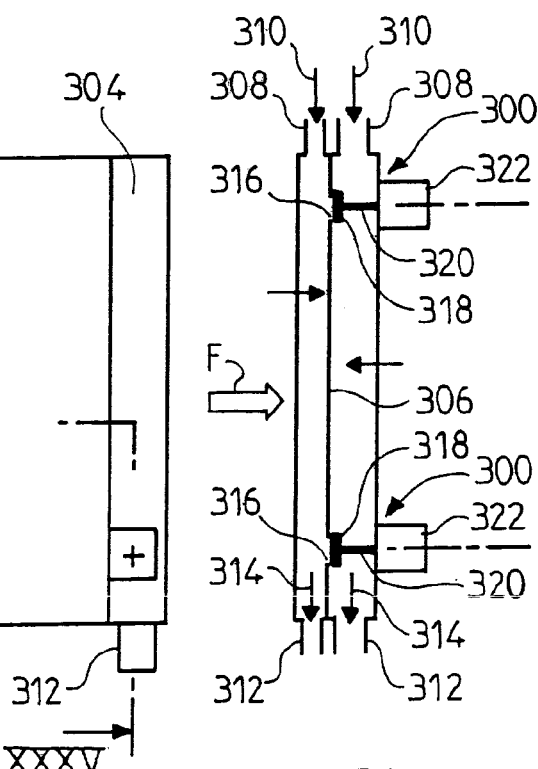

FIG. 34 is a front view and FIG. 35 is a cross-sectional view of a heat exchange module able to be part of the system shown in FIG. 3. This module comprises two rows of tubes, an inlet collector box 302 and an outlet collector box 304 located at the ends of the rows of tubes and separated by an intermediate partition 306. Inlet pipes 308 connected to the said inlet collector boxes 302 allow the inlet of the cooling fluid into the collector boxes, as indicated by the arrows 310, whilst the outlet pipes 312 connected to the outlet collector boxes 304 allow the outlet of the cooling fluid from the collector boxes, as indicated by the arrows 314 (FIG. 35). Two connecting orifices 316 are provided in the separating partition 306. The orifices 316 can be opened or closed by valves 318 mounted on rods 320 moved by actuators 322. The actuator can be constituted by a thermal jack composed of an expanding wax element actuated by a thermistor.

Figure 36:
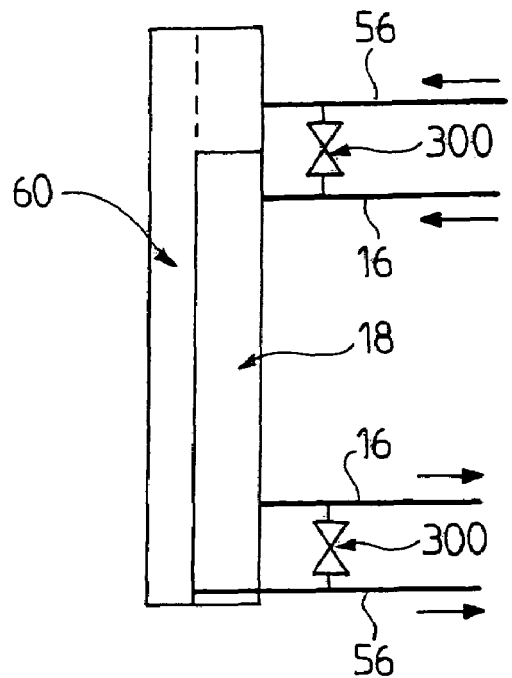
FIG. 36 is a partial cross-sectional view of a variant of a heat exchange module.

FIG. 36 shows a cross-section of a heat exchange module similar to the one shown in FIGS. 34 and 35, but in which the low temperature radiator 60 occupies the whole of the first row of tubes and the upper part of the second row of tubes. As for the high temperature radiator 18, this occupies the lower part of the second row of tubes. Thus, in this embodiment, the cooling capability of the low temperature exchanger is greater than that of the high temperature exchanger. An inlet pipeline of the low temperature fluid 56 is connected to the upper part of the second row of tubes, whilst the outlet of the low temperature fluid is connected to the lower part of the first row of tubes. The inlet and the outlet of the cooling radiator pipeline 16, respectively connected to the outlet and the inlet of the engine unit, are connected to the lower part of the second row of tubes. The interconnecting means (valve 300) are connected in parallel between the inlet and outlet pipelines of the high and low temperature fluids respectively.

Figure 37:
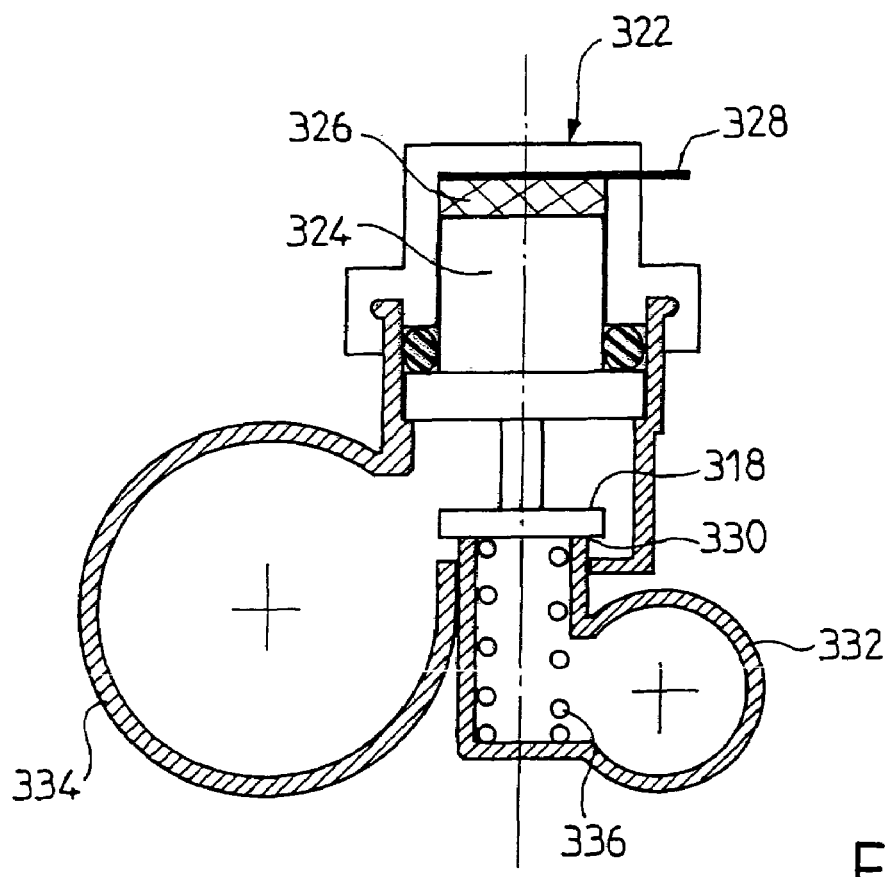
FIG. 37 is a detail view of interconnecting means intended for a heat exchange module forming part of the heat energy management system shown in FIG. 33.

FIG. 37 shows a particular embodiment of the interconnecting means. They comprise an actuator 322 constituted by a thermal jack 324 and a thermistor 326. The thermistor is connected to a connector 328 which receives an electrical signal making it possible to actuate the thermal jack. The valve 318 is able to obturate a seat 330 formed in an outlet pipeline of the low temperature pipe 332. When the valve 318 is detached from the seat 330, the low temperature pipe 332 is connected with the high temperature pipe 334. A return spring 336 makes it possible to apply force to the valve 318 tending to open the valve against the action of the thermal jack 324.

In a configuration of moderate load on the heat engine, the valves 300 are closed, such that the main low temperature system 2 and the secondary high temperature loop 4 are isolated from one another. The capability of cooling the heat engine is constituted solely by the high temperature radiator and the cooling capability of the secondary loop 4 is constituted by the low temperature radiator 60. On the contrary, in a heavy load configuration, the valves 300 are open, such that the fluid can also circulate in the low temperature radiator. Thus, the cooling capability of the main system is increased by that of the low temperature radiator. In the same way, the low temperature fluid of the secondary loop 4 can circulate in the high temperature radiator 18. In this configuration, the main system 2 and the secondary loop are not isolated from one another but, on the contrary, the cooling fluid can pass from one loop to the other.

The invention claimed is:

1. A system for managing the heat energy developed by a heat engine of a motor vehicle comprising a main system (2) equipped with a main pump (12) to make a coolant fluid circulate between the heat engine (10) and a main cooling radiator (18) having an exchange area and exchanging heat with the external atmospheric air, the main system (2) furthermore comprising a short-circuit pipeline (20) and a heating pipeline (22) comprising an air heater (24), and a secondary loop (4) including a secondary radiator (60) having an exchange area and a secondary pump (58), wherein the main radiator (18) or the secondary radiator (60) is divided into at least two separate heat exchange sections (144, 146), the change from one configuration to the other is carried out in increments, by the switching of a heat exchange section from one circuit to the other, and the main system (2) and the secondary loop (4) are connected by interconnecting means (6) which make it possible to control coolant fluid circulation between the main system (2) and the secondary loop (4) or to prohibit this circulation depending on the load state of the heat engine (10), wherein the main system (4) comprises a three-way (30-1, 30-2, 30-3) thermostatic valve (30), a first way (30-1) connected to the engine pipeline (8), a second way (30-2) being connected to a short-circuit pipeline (20), and a third way (30-3) connected to a main cooling radiator pipeline.

2. A system for managing the heat energy developed by a heat engine of a motor vehicle comprising a main system (2) equipped with a main pump (12) to make a coolant fluid circulate between the heat engine (10) and a main cooling radiator (18) having an exchange area and exchanging heat with the external atmospheric air, the main system (2) furthermore comprising a short-circuit pipeline (20) and a heating pipeline (22) comprising an air heater (24), and a secondary loop (4) including a secondary radiator (60) having an exchange area and a secondary pump (58), wherein the main radiator (18) or the secondary radiator (60) is divided into at least two separate heat exchange sections (144, 146), the change from one configuration to the other is carried out in increments, by the switching of a heat exchange section from one circuit to the other, and the main system (2) and the secondary loop (4) are connected by interconnecting means (6) which make it possible to control coolant fluid circulation between the main system (2) and the secondary loop (4) or to prohibit this circulation depending on the load state of the heat engine (10), wherein the main system (4) comprises a four-way (30-1, 30-2, 30-3, 30-4) thermostatic valve (30), a first way (30-1) being connected to an engine pipeline (8), a second way (30-2) connected to a short-circuit pipeline (20), a third way (30-3) connected to a main radiator pipeline (16) and a fourth way (30-4) connected to a heating pipeline (22).

3. The system as in claim 1, wherein the motor vehicle comprises one or more equipments exchanging heat with the environment which is outside them by the intermediary of an equipment heat exchanger (34, 36, 38, 64, 66), the equipment heat exchanger or exchangers being included in the main system (2) and/or in the secondary loop (4), each heat exchanger exchanging heat with the coolant cycle fluid.

4. The system as in claim 1, wherein the interconnecting means (6) form a cold start configuration comprising a main cold start loop and a secondary cold start loop that are isolated from each other, the main radiator (18) and the secondary radiator (60) included in the secondary cold start loop; and a normal operating configuration in which the circulation of the coolant fluid is carried out intermittently between the main cold start loop and the secondary cold start loop depending on the load state of the heat engine.

5. The system as in claim 4, wherein the interconnecting means (6) are additionally capable of forming a heavy load configuration in which the main system (2) and the secondary loop (4) are isolated from each other, the main radiator (18) being used exclusively for cooling the main system (2) and the secondary radiator (60) being used exclusively for cooling the secondary loop (4).

6. A system for managing the heat energy developed by a heat engine of a motor vehicle comprising a main system (2) equipped with a main pump (12) to make a coolant fluid circulate between the heat engine (10) and a main cooling radiator (18) having an exchange area and exchanging heat with the external atmospheric air, the main system (2) furthermore comprising a short-circuit pipeline (20) and a heating pipeline (22) comprising an air heater (24), and a secondary loop (4) including a secondary radiator (60) having an exchange area and a secondary pump (58), wherein the main radiator (18) or the secondary radiator (60) is divided into at least two separate heat exchange sections (144, 146), the change from one configuration to the other is carried out in increments, by the switching of a heat exchange section from one circuit to the other, and the main system (2) and the secondary loop (4) are connected by interconnecting means (6) which make it possible to control coolant fluid circulation between the main system (2) and the secondary loop (4) or to prohibit this circulation depending on the load state of the heat engine (10), wherein the interconnecting means comprise a four-way valve (70), a first threeway valve (72) and a second three-way valve (74), the four-way valve (70) and the first three-way valve (72) being included in the main system (2) the second three-way valve (74) being included in the secondary loop (4).

7. A valves system for producing the interconnection of a main system (2) equipped with a main pump (12) for causing a coolant cycle fluid to circulate between the heat engine (10) and a main cooling radiator (18) exchanging heat with the external atmospheric air, and a secondary loop (2) including a secondary radiator (60) and a secondary pump (58), wherein the system comprises a four-way valve (70), a first three-way valve (72) and a second three-way valve (74), the four-way valve (70) and the first three way valve (72) included in the main system (2), the second three-way valve (74) included in the secondary loop; wherein the main exchanger (18) is divided into a high temperature heat exchange section (144) permanently and exclusively included in the main system (2) arid an assignable heat exchange section (146) included either in the main system (2) or in the secondary loop (4), the secondary heat exchanger itself included permanently in the secondary loop (2); and wherein the interconnecting means (6) comprise two four-way valves (150).

8. A valves system for producing the interconnection of a main system (2) equipped with a main pump (12) for causing a coolant cycle fluid to circulate between the heat engine (10) and a main cooling radiator (18) exchanging heat with the external atmospheric air, and a secondary loop (2) including a secondary radiator (60) and a secondary pump (58), wherein the system comprises a four-way valve (70), a first three-way valve (72) and a second three-way valve (74), the four-way valve (70) and the first three way valve (72) included in the main system (2), the second three-way valve (74) included in the secondary loop; wherein the main exchanger (18) is divided into a high temperature heat exchange section (144) permanently and exclusively included in the main system (2) and an assignable heat exchange section (146) included either in the main system (2) or in the secondary loop (4), the secondary heat exchanger itself included permanently in the secondary loop (2); and, where in the interconnecting means (6) comprise a single valve having at least five ways (160, 210, 240, 250).

9. The system as in claim 8, wherein the five-way valve comprises a body (162) comprising a cylindrical side wall delimiting a cylindrical housing, at least two pipes (168) for the inlet or the outlet of the fluid in the body (162), a rotary adjustment device (174) mounted in a rotary manner about an axis (XX) in the cylindrical housing of the body (162), so that the rotary device assumes different angular positions for controlling the circulation of the fluid between the pipes.

10. The system as in claim 9, wherein the pipes of the valve are distributed on a single level.

11. The system as in claim 9, wherein the pipes of the valve are distributed over several levels.

12. The system as in claim 9, wherein the rotary adjustment device (174) comprises pockets (186) capable of connecting two or more than two pipes with each other.

13. The system as in claim 1, wherein the main system (2) and the secondary loop (4) each comprise an expansion vessel.

14. The system as in claim 1, wherein the main system (2) and the secondary loop (4) comprise a common expansion vessel.

15. The system as in claim 2, wherein the motor vehicle comprises one or more equipments exchanging heat with the environment which is outside them by the intermediary of an equipment heat exchanger (34, 36, 38, 64, 66), the equipment heat exchanger or exchangers being included in the main system (2) or in the secondary loop (4), each heat exchanger exchanging heat with the coolant cycle fluid.

16. The system as in claim 3, wherein the main radiator (18) and/or the secondary radiator (60) are part of a heat exchange module comprising a first heat exchanger (18) and a second heat exchanger (60) each one having an inlet collector box and an outlet collector box, the first heat exchanger (18) and the second heat exchanger (60) superimposed in such a way as to be traversed by the same flow of air, the outlet collector box of the first beat exchanger (18) connected with the inlet collector box of the second heat exchanger (60) by a connecting orifice, and a valve means making it possible to open or to close the connecting orifice.

17. The system as in claim 4, wherein the interconnecting means (6) forms a cold start configuration comprising a main cold start loop and a secondary cold start loop that are isolated from each other, the main radiator (18) and the secondary radiator (60) being included in the secondary cold start loop; and a normal operating configuration in which the circulation of the coolant fluid is carried out intermittently between the main cold start loop and the secondary cold start loop depending on the load state of the heat engine.

18. The system as in claim 16, further comprising a thermostatic valve (30) disposed in the main cold start loop, a circulation of coolant fluid taking plate between the main cold start loop and the secondary cold start loop depending on the open or closed state of the thermostatic valve (30).

19. The system as in claim 16, further comprising a thermostatic valve (30) disposed in the main cold start loop, a circulation of coolant fluid taking place between the main cold start loop and the secondary cold start loop depending on the open or closed state of the thermostatic valve (30).

20. The system as in claim 2, wherein the main system (2) and the secondary loop (4) each comprise an expansion vessel.

21. The system as in claim 2, wherein the main system (2) and the secondary loop (4) comprise a common expansion vessel.

22. The system as in claim 1, having at least an expensive vessel in secondary loop and wherein the secondary loop (4) comprises a secondary radiator pipeline (56) in which are connected the secondary radiator (60) and a secondary circulation pump (58), and a pipeline (62).

23. The system as in claim 2, wherein the motor vehicle comprises one or more equipments exchanging heat with the environment which is outside them by the intermediary of an equipment heat exchanger (34, 36, 38, 64, 66), the equipment heat exchanger or exchangers being included in the main system (2) and/or in the secondary loop (4), each heat exchanger exchanging heat with the coolant cycle fluid.

* * * * *